United States Patent
Harmel et al.

(10) Patent No.: US 12,017,645 B1
(45) Date of Patent: Jun. 25, 2024

(54) CONTROLLING MERGING VEHICLES

(71) Applicant: Zoox, Inc., Foster City, CA (US)

(72) Inventors: Moritz Harmel, San Francisco, CA (US); Rick Zhang, San Mateo, CA (US)

(73) Assignee: Zoox, Inc., Foster City, CA (US)

(*) Notice: Subject to any disclaimer, the term of this patent is extended or adjusted under 35 U.S.C. 154(b) by 214 days.

(21) Appl. No.: 17/103,099

(22) Filed: Nov. 24, 2020

(51) Int. Cl.
  *B60W 30/09* (2012.01)
  *B60W 30/095* (2012.01)
  *B60W 40/072* (2012.01)
  *B60W 50/00* (2006.01)
  *B60W 60/00* (2020.01)

(52) U.S. Cl.
  CPC ........ *B60W 30/09* (2013.01); *B60W 30/0953* (2013.01); *B60W 30/0956* (2013.01); *B60W 40/072* (2013.01); *B60W 50/0097* (2013.01); *B60W 60/0015* (2020.02); *B60W 60/0027* (2020.02); *B60W 2520/105* (2013.01); *B60W 2552/30* (2020.02); *B60W 2554/4042* (2020.02); *B60W 2555/60* (2020.02)

(58) Field of Classification Search
  CPC ............. B60W 30/09; B60W 30/0953; B60W 30/0956; B60W 60/0027; B60W 40/072; B60W 50/0097; B60W 2555/60
  See application file for complete search history.

(56) References Cited

U.S. PATENT DOCUMENTS

| | | | |
|---|---|---|---|
| 10,906,558 B1* | 2/2021 | Hwang | B60W 60/0027 |
| 11,416,943 B2* | 8/2022 | Shalev-Shwartz | G07C 5/08 |
| 2016/0161271 A1* | 6/2016 | Okumura | B60W 30/18154 701/25 |
| 2017/0137025 A1* | 5/2017 | Muto | G01C 21/30 |
| 2020/0159232 A1* | 5/2020 | Refaat | G06N 3/08 |
| 2020/0207354 A1* | 7/2020 | Ishioka | B60W 30/18163 |
| 2020/0307593 A1* | 10/2020 | Hirosawa | B60W 50/10 |
| 2021/0107476 A1* | 4/2021 | Cui | B60W 60/00276 |
| 2021/0237738 A1* | 8/2021 | Yu | B60W 40/04 |
| 2022/0048535 A1* | 2/2022 | Niendorf | G06N 20/00 |
| 2022/0105959 A1* | 4/2022 | Hartnett | B60W 60/0027 |
| 2022/0153263 A1* | 5/2022 | Hotta | B60W 30/18159 |
| 2022/0227367 A1* | 7/2022 | Kario | B60W 30/0956 |

* cited by examiner

Primary Examiner — Joseph M Rocca
Assistant Examiner — Zachary Joseph Wallace
(74) Attorney, Agent, or Firm — Lee & Hayes, P.C.

(57) ABSTRACT

A vehicle computing system may implement techniques to control a vehicle to avoid collisions between the vehicle and an object in an environment in which a vehicle path and an object path merge. The techniques may include determining an initial merge location associated with the vehicle path and the object path and a final merge location. The final merge location may represent a location at which the vehicle is proximate to and ahead of the object. The vehicle computing system may determine whether the vehicle may proceed to the final merge location and merge with the object without the occurrence of a collision. The vehicle computing system may determine to maintain a vehicle trajectory or modify the vehicle to trajectory to yield to the object based on a determination of whether the vehicle may proceed without the occurrence of the collision.

20 Claims, 5 Drawing Sheets

CONTROLLING MERGING VEHICLES

BACKGROUND

Vehicles may be equipped with safety systems configured to detect and avoid objects in an operating environment. The objects may include mobile objects, such as other vehicles, cyclists, pedestrians, etc. Traditional safety systems may avoid collisions by simply identifying the presence of an object in an environment and yielding to avoid collision with the object, regardless of whether the vehicle and the object can effectively merge. However, these traditional systems may cause the vehicle to yield in situations in which it is unnecessary and unnatural, thereby potentially causing traffic delays or otherwise causing issues with respect to safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
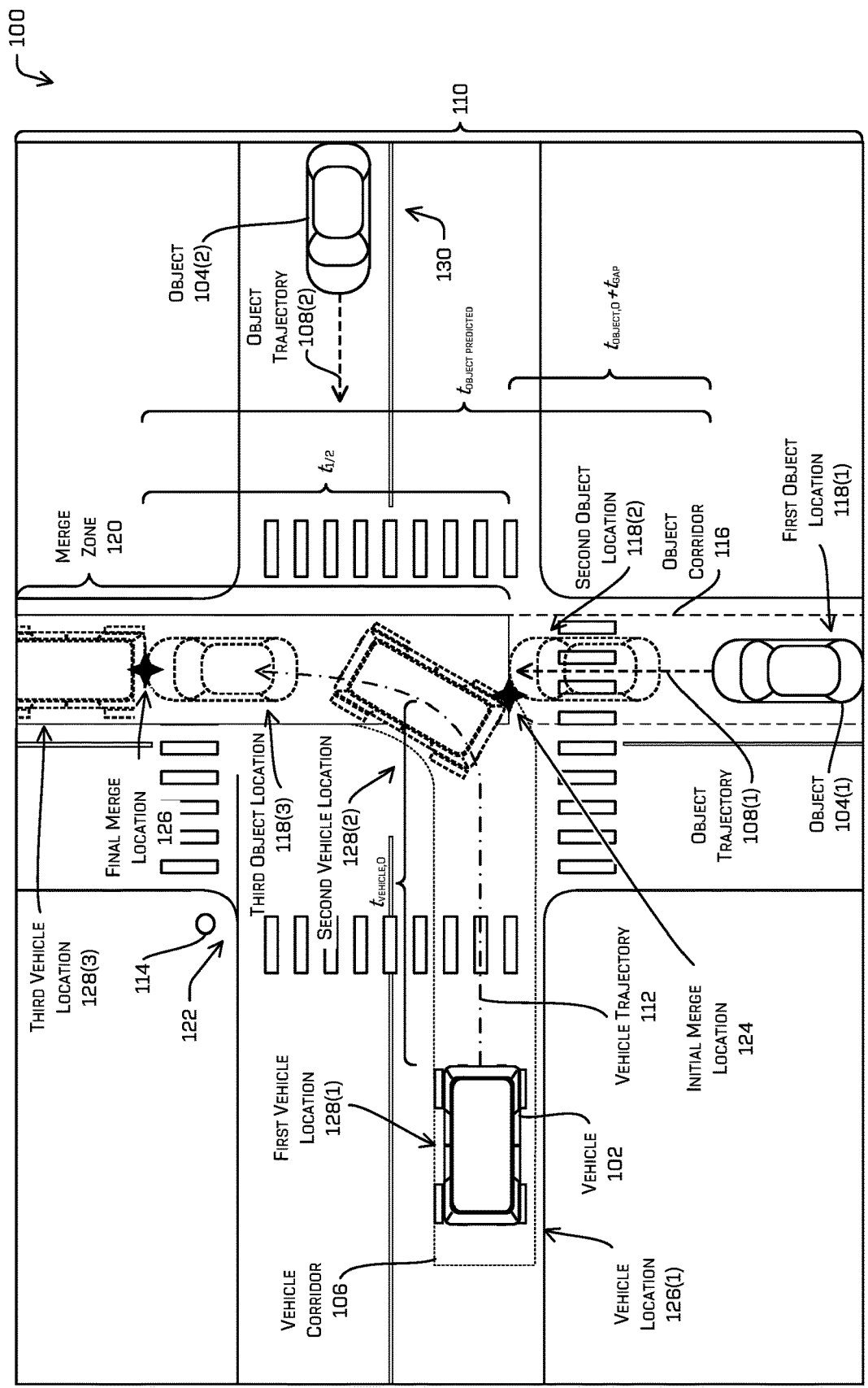
FIG. 1 is an illustration of a vehicle in an environment, wherein a safety system detects an object with an object trajectory that merges with a vehicle trajectory and determines an action for the vehicle to perform based at least in part on a time associated with a merge operation, in accordance with examples of the disclosure.

This disclosure is directed to techniques for improving operation of a vehicle in relation to an object in an environment in which a path of the vehicle and a path of the object merge (e.g., same direction of travel in a same lane). The vehicle may include an autonomous or semi-autonomous vehicle. The objects may include dynamic objects such as other vehicles (e.g., cars, trucks, motorcycles, mopeds, etc.), pedestrians, bicyclists, or the like. A vehicle computing system may be configured to detect the object in the environment and determine that an object path and a vehicle path merge. The vehicle computing system may also be configured to determine a threshold time associated with a merge operation of the vehicle relative to the object. The threshold time may include a time associated with the vehicle merging into the object path (or vice versa) and modifying a speed as appropriate for the environment. The vehicle computing system may determine an action to perform based on the threshold time, such as to yield to the object or to proceed along the vehicle path ahead of the object (e.g., proceed with the merge).

The vehicle computing system may be configured to determine the object in the environment based on sensor data from one or more sensors (e.g., cameras, motion detectors, lidar, radar, etc.) of the vehicle. In some examples, the objects may be identified based on sensor data received from remote sensors, such as, for example, sensors associated with another vehicle or sensors mounted in an environment that are configured to share data with a plurality of vehicles. In various examples, the vehicle computing system determines the object location based on the sensor data.

In some examples, the vehicle computing system may be configured to determine an object corridor representing a two-dimensional potential path of the object through the environment, based in part on the object location. In some examples, the vehicle computing system may determine a predicted trajectory associated with the object, such as based on the sensor data and/or historical data about the object. In some examples, the object corridor may be based on the predicted trajectory. For example, the vehicle computing system may determine that the object is predicted to continue straight at an intersection, merging into a vehicle corridor (e.g., vehicle path). The object corridor may include a representation of the object going straight through the intersection. In some examples, the vehicle computing system may determine a lane associated with the object location. In some examples, the vehicle computing system may determine the object corridor based on the lane. For example, the object corridor may include an area defined by a distance extending from either side of a centerline of the lane.

In various examples, the vehicle computing system generates a vehicle corridor representing a two-dimensional planned path of the vehicle through the environment. In some examples, the vehicle corridor may include a path polygon, such as that described in U.S. patent application Ser. No. 16/136,038, filed Sep. 19, 2018 and entitled "Collision Prediction and Avoidance for Vehicles," the entire contents of which are incorporated herein by reference. In some examples, the vehicle computing system may determine an initial merge location based in part on the vehicle corridor and the object corridor. In various examples, the vehicle computing system may determine the initial merge location utilizing techniques described in U.S. patent application Ser. No. 16/663,161, filed Oct. 24, 2019 and entitled "Trajectory Modifications based on a Collision Zone," the entire contents of which are incorporated herein by reference. The initial merge location may include an intersection of the vehicle corridor and the object corridor. In various examples, the initial merge location may include a location at which the vehicle trajectory intersects and shares a direction of travel with the object trajectory, or vice versa. In some examples, the initial merge location may represent a first location at which the vehicle and the object could potentially collide.

In various examples, the vehicle computing system may determine a threshold time associated with the merge of the vehicle and the object. The threshold time may include a time associated with the vehicle traveling to a final merge location. The final merge location may include a location at which a rear portion of the vehicle is proximate and in front of a front portion of the object, with substantially matching speeds. In some examples, the final merge location may represent a hypothetical point in the environment at which the rear portion of the vehicle and the front portion of the object are at a closest point of approach without a collision, such that the vehicle and object safely merge without colliding. In some examples, a vehicle speed and an object speed may substantially match (e.g., within 0.3 meters per second, 2 feet per second, etc.) at the final merge location, after which, the vehicle speed may increase and/or the object speed may decrease such as to increase a distance therebetween. For example, the final merge location may represent a point at which a rear bumper of the vehicle is a distance (e.g., 0.1 inches, 0.5 feet, 0.5 meters, etc.) from a front bumper of the object, with an object speed substantially matching a vehicle speed.

In various examples, the vehicle computing system may determine a predicted time associated with the object traveling to the final merge location. In some examples, the predicted time may be determined based on the object trajectory (e.g., object speed associated therewith). In some examples, the predicted time may be determined based on a constant acceleration (e.g., −1 meter per second$^2$, 2 feet per second$^2$, etc.). In various examples, the vehicle computing system may compare the predicted time to the threshold time for the vehicle to merge. Based on a determination that the predicted time is greater than the threshold time for the vehicle to merge, the vehicle computing system may determine to modify the vehicle trajectory to yield to the object. Based on a determination that the predicted time is less than or equal to the threshold time, the vehicle may maintain the vehicle trajectory and proceed ahead of the object in the merge operation.

In some examples, the vehicle computing system may continuously and/or periodically (e.g., every 100 milliseconds, every 0.5 seconds, etc.) monitor locations of the object over time to determine whether the object time associated with the object traveling to the final merge location is equal to or less than the threshold time. For example, the vehicle computing system determines that, at a first time, the object time is equal to the threshold time. Based on the object time being equal to the threshold time, the vehicle computing system determines to maintain a vehicle trajectory at the first time and proceed with the merge operation. At a second time after the first time, the vehicle computing system determines that the object has accelerated faster than anticipated and that the object time is greater than the threshold time. Based on the determination that the object time is greater than the threshold time, the vehicle computing system determines to modify the vehicle trajectory and yield to the object.

The techniques discussed herein may improve a functioning of an autonomous and/or semi-autonomous vehicle in a number of ways. Traditionally, a vehicle computing system of an autonomous or semi-autonomous vehicle detects a merging object in an environment and controls the vehicle according to a most conservative action, which is to yield for the object, oftentimes regardless of a right of way. These traditional systems may result in unnecessary and unnatural yielding situations, which may cause traffic delays. The techniques described herein solve the problem of unexpected yields and improve the functioning of the vehicles (and improve traffic flow) by determining whether a vehicle and object can safely merge in an environment, such as without colliding. Based on a determination that the vehicle and object may merge safely, the vehicle computing system may determine to maintain a vehicle trajectory, thereby not creating traffic delays caused by unexpected yields. Additionally, the techniques described herein ensure that the vehicle may yield to a merging object without colliding therewith. Accordingly, the vehicle computing system may control the vehicle through the environment, ensuring the safe operation thereof. These and other improvements to the functioning of autonomous and/or semi-autonomous vehicles are discussed herein and may, in some instances, be achieved using the techniques described herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of a vehicle 102 and two objects 104 (e.g., a first object 104(1) and a second object 104(2)) in an environment 100, wherein a vehicle corridor 106 associated with the vehicle 102 and estimated object trajectories 108 are overlaid in the illustration representing a two-dimensional map 110 of the environment 100 generated by an improved safety system of the autonomous vehicle 102 (vehicle 102). A vehicle computing device may perform the improved safety system of the vehicle 102. While described as a separate system, in some examples, the merging techniques described herein may be implemented by other vehicle systems, components, and/or computing devices. For example, and as will be described in further detail with regard to FIG. 4, the merging techniques described herein may be implemented at least partially by or in associated with a planning component 424.

In various examples, the vehicle computing device may generate the vehicle corridor 106 of the vehicle 102. In various examples, the vehicle corridor 106 may be determined based on a vehicle trajectory 112 (e.g., speed, acceleration, direction of travel, etc.). The vehicle trajectory 112 may represent a planned path of the vehicle traveling through the environment 100. In some examples, the vehicle corridor 106 may be determined based on one or more maps of the environment 100. In such examples, the vehicle computing system may access one or more maps and determine the vehicle corridor 106 based on the map(s). In some examples, the vehicle corridor 106 may represent a two-dimensional representation of the planned path of the vehicle 102 through the environment 100. The vehicle corridor 106 may include an area defined by a width of the vehicle and/or a buffer region (e.g., 1 foot, 1 meter, etc.) on either side of the vehicle 102 and a distance in front of and/or behind the vehicle 102. In some examples, the vehicle corridor 106 may include a path polygon. In such examples, the path polygon may be generated utilizing the techniques described in U.S. patent application Ser. No. 16/539,928, filed Aug. 13, 2019 and entitled "Cost-Based Path Determination," the entire contents of which are incorporated by reference herein.

In various examples, the vehicle computing system may be configured to detect one or more objects 104 in the environment 100. The vehicle computing system may detect the object(s) 104 based on sensor data received from one or more sensors. In some examples, the sensor(s) may include sensors mounted on the vehicle 102, such as, for examples, cameras, motion detectors, lidar, radar, etc. In some examples, the sensor(s) may include one or more remote sensors, such as, for example sensors mounted on another vehicle and/or sensors 114 mounted in the environment 100. In various examples, vehicle 102(1) may be configured to transmit and/or receive data from vehicle 102(2) and/or sensors 114. The data may include sensor data, such data regarding objects(s) 104 identified in the environment 100.

In various examples, the environment 100 may include sensors 114 for traffic monitoring, collision avoidance, or the like. In some examples, the sensors 114 may be mounted in the environment 100 to provide additional visibility in an area of reduced visibility, such as, for example, in a blind or semi-blind intersection. For example, an intersection in the environment 100 may be determined to have a blind intersection, where approaching vehicles 102 may not be able to perceive objects 104 and/or other vehicles approaching from the left or right on the intersecting road. The intersection in the environment 100 may thus include a sensor 114 to provide sensor data to an approaching vehicle 102 regarding a first object 104(1) approaching the intersection from the intersecting road.

In various examples, the vehicle computing system may receive the sensor data and may determine a type of object 104 (e.g., classify the type of object), such as, for example, whether the object 104 is a car, truck, motorcycle, moped, bicyclist, pedestrian, or the like. In various examples, the vehicle computing system may determine one or more object corridors 116 (e.g., object polygon(s)) based on the sensor data and/or the type of object 104. In such examples, the object corridor(s) 116 may represent one or more possible paths that the object may travel through the environment 100. In various examples, the object corridor(s) 116 may include an area defined by a width of the object 104 and/or a buffer region (e.g., 1 foot, 1 meter, etc.) on either side of the object 104 and a distance in front of and/or behind the object 104. In various examples, the object corridor(s) 116 may be determined based on one or more predicted trajectories 108 associated with the object (object trajectories 108).

In various examples, the vehicle computing system may determine the one or more predicted trajectories 108 based on the sensor data and/or the type of object 104. In some examples, the trajectories 108 may include any number of possible paths in which the object 104 may travel from a current location (e.g., first object location 118(1)) and/or based on a direction of travel. In the illustrative example, the object 104(1) continues straight in a first object trajectory 108(1). However, in other examples, a number of trajectories may be greater than one, including, but not limited to, a continuous representation of all possible trajectories (e.g., left turn, right turn, etc.). In some examples, the number of trajectories may vary depending on a variety of factors, such as the classification of the object (e.g., type of object), other stationary and/or dynamic objects, drivable surfaces, etc. In various examples, the vehicle computing system may determine the action for the vehicle 102 to perform based on each of the one or more predicted trajectories 108 (e.g., predicted paths) of an object 104. In some examples, the vehicle computing system may determine the action for the vehicle 102 to perform based on a predicted trajectory with a highest probability and/or a probability above a threshold probability.

In various examples, the vehicle computing system may be configured to rank the one or more predicted object trajectories 108 based on a probability that the object 104 will follow an associated predicted object trajectory 108. In some examples, the vehicle computing system may perform the techniques described herein to determine whether to yield (e.g., modify the vehicle trajectory 112) to the object 104 based on each predicted object trajectory 108, such as in a ranked order (e.g., highest to lowest, etc.). In some examples, the vehicle computing system may determine an action for the vehicle 102 to perform based on a probability associated with a predicted object trajectory 108 being above a threshold probability (e.g., 65%, 75%, etc.).

In some examples, the one or more predicted object trajectories 108 may be determined using a probabilistic heat map (e.g., discretized probability distribution) to predict object behavior, such as that described in U.S. patent application Ser. No. 15/807,521, filed Nov. 8, 2017 and entitled "Probabilistic Heat Maps for Behavior Prediction," the entire contents of which are incorporated herein by reference. In some examples, the one or more predicted trajectories may be based on a top-down representation of an environment, such as by utilizing the techniques described in U.S. patent application Ser. No. 16/151,607, filed Oct. 4, 2018 and entitled "Trajectory Prediction on Top-Down Scenes," and in U.S. patent application Ser. No. 16/504,147, filed Jul. 5, 2019 and entitled "Prediction on Top-Down Scenes based on Action Data," the entire contents of which are incorporated herein by reference. In various examples, the one or more predicted trajectories may be determined utilizing tree search methods, temporal logic formulae, and/or machine learning techniques.

In various examples, the vehicle computing system may determine that a predicted object trajectory 108 includes a merging trajectory (e.g., object trajectory 108(1)). The merging trajectory may include an object trajectories 108 that merges into the path of the vehicle 102, such that the vehicle 102 and a merging object 104(1) may share a same lane. A merge may be represented by an intersection of the object trajectory 108 and the vehicle trajectory 112 and a subsequent shared direction of travel associated therewith. In various examples, the vehicle computing system may determine the object trajectory 108(1) is a merging trajectory based on a determination that the vehicle corridor 106 associated with the vehicle trajectory 112 (e.g., planned path of the vehicle 102) intersects and merges with the object corridor 116 associated with the object trajectory 108(1).

In some examples, the vehicle computing system may determine that a speed of the vehicle 102 is equal to or greater than a speed of the object 104(1) and that the vehicle 102 and object 104(1) may safely merge. In various examples, the vehicle computing system may determine the speed of the object 104(1) ($v_{object,sensor}$) based on the sensor data, such as determining how far the object 104(1) travels over time. In some examples, the vehicle computing system may determine a maximum speed ($v_{object,max}$) of the object 104(1) based on a road speed associated with the environment 100. In such examples, the vehicle computing system may determine the object speed based on a speed limit or the speed limit plus a buffer (e.g., +5 miles per hour, 5 kilometers per hour, etc.).

In some examples, the vehicle computing system may determine that the object 104(1) is traveling on a curved road. In such examples, the vehicle computing system may determine the object speed ($v_{object,curvature,k}$) based on a maximum lateral acceleration associated with a reference line absolute curvature of the road $|k_{road,0}|$ at an intersection 122 associated with an initial merge location 124 (e.g., a location associated with an intersection of the vehicle corridor 106 and the object corridor 116). In various examples, the object speed on a curved road may be represented by the following equation:

$$v_{object,curvature,k} = \sqrt{\frac{a_{lateral,max}}{|k_{road,0}|}} \quad (1)$$

In various examples, the vehicle computing system may determine the object speed based on a minimum value between the ($v_{object,sensor}$), ($v_{object,max}$), and/or ($v_{object,curvature,k}$). In such examples, the vehicle computing system may determine that the object speed includes the lowest value of the ($v_{object,sensor}$), ($v_{object,max}$), and/or ($v_{entity,curvature,k}$), such that $$v_{object} = \min(v_{object,sensor}, v_{object,max}, v_{object,curvature,k}) \quad (2)$$

In some examples, the vehicle computing system may determine that a probability of collision may be below a threshold value due to the vehicle speed as compared to the object speed ($v_{object}$). In some examples, based on a determination that the vehicle speed is greater than an object speed and/or that the probability of collision is below the threshold value, the vehicle computing system may determine to maintain the vehicle trajectory 112. For example, a vehicle trajectory 112 may include the vehicle 102 traveling straight through an intersection 122, and the object trajectory 108(1) of the object 104(1) may include the object turning right at the intersection 122, resulting in an overlap between the vehicle corridor 106 and the object corridor 116, at least for a time. The vehicle computing system may determine that a vehicle speed associated with the vehicle trajectory 112 is greater than the object speed associated with the object trajectory 108(1) and that the vehicle 102 may safely transit through the intersection without a potential of collision with the object 104(1) (e.g., probability of collision below a threshold probability). Based on a determination that the vehicle speed is greater than the object speed and/or that a probability of collision is less than a threshold, the vehicle computing system may determine to maintain the vehicle trajectory through the intersection 122 such that the object 104 may merge in behind the vehicle 102.

In some examples, based on a determination that the speed of the vehicle 102 is equal to or less than the speed of the object 104(1), the vehicle computing system may determine a merge zone 120 between the vehicle trajectory 112 and the object trajectory 108(1). In various examples, the merge zone 120 may represent an area associated with the vehicle 102 merging into a path of an object 104, or vice versa, and modifying a speed as appropriate for the environment 100. For example, the merge zone 120 may represent an area associated with the vehicle 102 merging into the object corridor 116 and accelerating to substantially match a speed of the object 104(1) and/or accelerating to a speed limit of the environment 100.

In various examples, the merge zone 120 may include an area along a vehicle corridor 106 and/or an object corridor 116 from an initial merge location 124 to a final merge location 126. As illustrated in FIG. 1, the merge zone 120 may additionally include an area associated with the vehicle 102 at a vehicle location 128 associated with the final merge location 126 (e.g., third vehicle location 128(3)).

In some examples, the vehicle computing system may determine an initial merge location 124 based in part on the vehicle corridor 106 and the object corridor 116. In some examples, the initial merge location 124 may be proximate to and/or within a threshold distance (e.g., 3 feet, 0.5 meters, ½ vehicle width, etc.) of an intersection of the vehicle corridor 106 and the object corridor 116. In various examples, the initial merge location 124 may be proximate to and/or within a threshold distance of a location at which the vehicle trajectory 112 merges with the object trajectory 108, or vice versa. In some examples, the initial merge location 124 may represent a first location at which the vehicle 102 and the object 104(1) could potentially collide.

In some examples, the initial merge location 124 may represent a hypothetical location at which a rear portion of the vehicle 102 may be proximate to and ahead of a front portion of the object 104, such that it represents an initial point of merge between the vehicle 102 and the object 104. For example, as illustrated in FIG. 1, a rear bumper of the vehicle 102 is proximate to and ahead of a front bumper of the object 104(1) at the initial merge location 124.

In various examples, the vehicle computing system may determine the final merge location 126 based on a vehicle speed associated with the vehicle trajectory 112 and an object speed associated with the object trajectory 108(1). In some examples, the vehicle computing system may determine the final merge location 126 based on a predetermined positive acceleration (e.g., 1 meter per second², 1.5 meters per second², 2 feet per second², etc.) of the vehicle 102 and/or a predetermined negative acceleration (e.g., −1 meter per second², −1.6 meters per second², −2 feet per second², etc.) of the object 104(1).

In various examples, the vehicle computing system may determine the final merge location 126 and/or a time associated therewith based on a speed and a predetermined positive acceleration of the vehicle 102 from the initial merge location 124 and a speed and a negative acceleration of the object 104(1) from the initial merge location 124. In some examples, the predetermined positive acceleration and the predetermined negative acceleration may include a same absolute value. For example, the predetermined positive acceleration may be 1.5 meters per second², and the predetermined negative acceleration is −1.5 meters per second². In some examples, the predetermined positive acceleration may represent a maximum acceleration of the vehicle 102 and the predetermined negative acceleration may represent a maximum deceleration of the object 104(1).

In some examples, the vehicle computing system may determine the final merge location 126 by first determining a location of the rear portion of the vehicle 102 at a time (1) that is after an initial time associated with the initial merge location 124 ($t_0$). The location of the rear portion of the vehicle 102 may be determined utilizing the following equation:

$$s_{vehicle}(t) = s_{vehicle}(t_0) + v_{vehicle}(t_0)(t - t_0) + \frac{a_{vehicle}}{2}(t - t_0)^2, \quad (3)$$

where $v_{vehicle}$ represents the speed of the vehicle 102 at the initial merge location 124 and $a_{vehicle}$ represents the predetermined positive acceleration of the vehicle 102. In various examples, the initial merge location 124 may represent a starting point for the calculation of the location of the rear portion of the vehicle 102 and thus the vehicle computing system may determine that $s_{vehicle}(t_0)=0$.

The vehicle computing system may additionally determine a location of the front portion of the object 104(1) at a time (f) after an initial time associated with the initial merge location 124 plus a time gap (e.g., $t > t_0 + t_{gap}$). In various examples, the time gap may represent a time required for the vehicle 102 and the object 104(1) to equalize speeds. In such examples, the time gap may represent an amount of time for the vehicle to accelerate and the object to decelerate until the vehicle speed and the object speed are the same or substantially similar. The location of the front portion of the object 104(1) may be determined utilizing the following equation:

$$s_{object(t)} = s_{object}(t + t_{gap}) + \\ v_{object}(t_0 + t_{gap})(t - (t_0 + t_{gap}))^2 + \frac{a_{object}}{2}(t - (t_0 + t_{gap}))^2, \quad (4)$$

where $v_{object}$ represents the speed of the object 104(1) at the initial merge location 124 and $a_{object}$ represents the predetermined negative acceleration of the object 104(1). In various examples, the initial merge location 124 may represent a starting point for the calculation of the location of the front portion of the object 104(1) and thus the vehicle computing system may determine that $s_{object}(t_0+t_{gap})=0$. In various examples, $t_{gap}$ may represent a period of time associated with the vehicle 102 arriving at the initial merge location 124 ahead of the object 104(1), based on the vehicle trajectory 112.

The vehicle computing system may determine the final merge location 126 by determining a time at which the location of the rear portion of the vehicle 102 and the location of the front portion of the object 104(1). The final merge location 126 may be determined based on the following equation:

$$v_{vehicle}(t_0)(t - t_0) + \frac{a_{vehicle}}{2}(t - t_0)^2 = \\ v_{object}(t_0 + t_{gap})(t - (t_0 + t_{gap})) + \frac{a_{object}}{2}(t - (t_0 + t_{gap}))^2 \quad (5)$$

In various examples, the vehicle computing system may determine that $(t_0)=0$ and may simplify notation to include $v_{vehicle}(t_0)=v_{vehicle,0}$ and $v_{object}(t_0+t_{gap})=v_{object,0}$, the (0) in the subscript indicating a constant expression. In at least one example, the vehicle computing system may utilize a same absolute value for a positive acceleration of the vehicle 102 and a negative acceleration of the object 104(1), such that $\{a=a_{vehicle}=-a_{object}\}$. In such an example, the vehicle computing may simplify the equation above to:

$$v_{vechicle,0}t + \frac{a}{2}t^2 = v_{object,0}(t - t_{gap}) + \frac{a}{2}(t - t_{gap})^2 \quad (6)$$

The vehicle computing system may determine one or more times associated with the final merge location 126 by the following equation:

$$t_{1/2} = -\frac{1}{2}\left(\frac{v_{vehicle,0} - v_{object,0}}{a} - t_{gap}\right) \pm \\ \sqrt{\frac{1}{4}\left(\frac{v_{vehicle,0} - v_{object,0}}{a} - t_{gap}\right)^2 - \left(\frac{v_{entity,0}t_{gap}}{a} + \frac{t_{gap}^2}{2}\right)} \quad (7)$$

The time $t_{1/2}$ may represent a time associated with the vehicle 102 traveling from the initial merge location 124 (represented by a second vehicle location 128(2)) to the final merge location 126 (represented by a third vehicle location 128(3)). In some examples, the time $t_{1/2}$ may additionally represent a time associated with the object 104(1) traveling from the initial merge location 124 (represented by a second object location 118(2)) to the final merge location 126 (represented by a third object location 118(3)).

In various examples, the vehicle computing system may determine a number of times associated with the final merge location 126. Based on a determination that the quadratic equation represented in equation (7) results in two times, the vehicle computing system may determine to modify the vehicle trajectory 112 to yield to the object 104(1). In various examples, the resulting two times may represent the front portion of the object 104(1) traveling beyond the rear portion of the vehicle 102 (a first time) and decelerating back to a location associated with the rear portion of the vehicle 102. In such examples, the exceedance of the location associated with the rear portion of the vehicle 102 may represent a collision and thus may result in the determination to not merge in front of the object 104(1).

In some examples, the vehicle computing system may determine that the result of equation (7) is $t_{1/2}=0$. In such examples, the vehicle computing system may determine that there are no times at which the rear portion of the vehicle 102 is proximate to and ahead of the front portion of the object 104(1) (e.g., substantially co-located). In some examples, the determination that there are no times at which the front portion of the object 104(1) will be proximate the rear portion of the vehicle 102 indicates that the merge operation can be accomplished with less than a threshold probability of collision. In such examples, based on a determination that no times exist in which the rear portion of the vehicle 102 is proximate to the front portion of the object 104(1), the vehicle computing system may determine to maintain a vehicle trajectory 112 and merge in front of the object 104(1).

In some examples, the vehicle computing system may determine a threshold time associated with the merge operation based on the quadratic equation represented in equation (7) resulting in a single time. The vehicle computing system may determine a single solution to the equation (7) based on a determination that the following condition exists:

$$\frac{1}{4}\left(\frac{v_{vehicle,0} - v_{object,0}}{a} - t_{gap}\right)^2 - \left(\frac{v_{entity,0}t_{gap}}{a} + \frac{t_{gap}^2}{2}\right) = 0 \quad (8)$$

The vehicle computing system may determine a time gap between the initial merge location 124 and the final merge location 126 utilizing a quadratic function for $t_{gap}$, represented as:

$$t_{gap,1} = \frac{1}{a}\left(-(v_{vehicle,0} + v_{object,0}) + \sqrt{2(v_{vehicle,0}^2 + v_{object,0}^2)}\right) \geq 0 \quad (9)$$

Additionally, the quadratic function for $t_{gap}$ may result in the following equation:

$$t_{gap,2} = \frac{1}{a}\left(-(v_{vehicle,0} + v_{object,0}) + \sqrt{2(v_{vehicle,0}^2 + v_{object,0}^2)}\right) \leq 0. \quad (10)$$

However, the negative solution associated with equation (10) does not fulfill $t > t_0 + t_{gap}$ for which the motion equation for the object (e.g., equation (4) above) is valid. As such, the vehicle computing system may determine that $t_{gap,1}$ represents a time gap associated with the vehicle 102 and/or object 104(1) traveling to the final merge location 126 (e.g., represented by third vehicle location 128(3) and third object location 118(3)). In some examples, $t_{gap,1}$ represents an amount of time required for the vehicle 102 and the object 104(1) to merge without a collision therebetween (e.g., probability of collision below a threshold probability).

In various examples, the vehicle computing system may determine the threshold time based on the time $t_{1/2}$ for the vehicle to travel from the initial merge location 124 to the final merge location 126, as described above with reference to equation (7). In various examples, the threshold time may represent a first time for the vehicle 102 to travel from a first vehicle location 128(1) to a second vehicle location 128(2) associated with the initial merge location 124 plus the time $t_{1/2}$. In such examples, the threshold time may represent a total time for the vehicle to travel from the first vehicle location 128(1) to the initial merge location 124 and then to a third vehicle location 128(3) associated with the final merge location 126. In various examples, the threshold time may be represented by the following equation:

$$\text{Threshold time} = t_{vehicle\ initial} + t_{1/2} \quad (11)$$

In various examples, the vehicle computing system may determine a predicted time ($t_{object\ predicted}$) for the object 104(1) to travel to an object location 118 (e.g., third object location 118(3)) associated with the final merge location 126. In some examples, the vehicle computing system may determine the predicted time based on a current object location 118 (e.g., first object location 118(1)) and a speed associated with the object trajectory 108(1). In such examples, the predicted time may represent a time associated with the object 104(1) traveling from the first object location 118(1) to the third object location 118(3) at the object speed.

In various examples, the vehicle computing system may determine an action for the vehicle 102 to perform based on the threshold time for the merge operation and the predicted time for the object 104(1) to travel from the first object location 118(1) to the third object location 118(3). Based on a determination that the predicted time associated with the object 104(1) traveling to the third object location 118(3) is less than the threshold time, the vehicle computing system may determine to maintain the vehicle trajectory 112 and/or one or more speeds associated therewith to merge in front of the object 104(1).

Based on a determination that the predicted time associated with the object traveling to the third object location 118(3) is greater than the threshold time, the vehicle computing system may determine to modify the vehicle trajectory 112 to yield to the object 104(1). In various examples, modification of the vehicle trajectory 112 may include a change to the one or more speeds associated therewith, such as to slow a forward movement and/or stop in order to permit the object 104(1) to proceed ahead of the vehicle 102.

As depicted in equation (9) above, the threshold time may increase as the speeds of the object 104(1) and/or the vehicle 102 increase. As such, the determination to yield may be more conservative as the speeds increase. Utilizing more conservative approach to yielding as the speeds increase may ensure the safety of both the vehicle 102 and the object 104(1) operating in the environment 100.

In some examples, the vehicle computing system may continuously and/or periodically (e.g., every 100 milliseconds, every 0.5 seconds, etc.) monitor locations of the object 104(1) over time to determine whether the predicted time associated with the object 104(1) traveling to the final merge location 126 is equal to or less than the threshold time. For example, the vehicle computing system determines that, at a first time, the predicted time is equal to the threshold time. Based on the object time being equal to the threshold time, the vehicle computing system determines to maintain a vehicle trajectory 112 at the first time and proceed with the merge operation. At a second time after the first time, the vehicle computing system determines that the object 104(1) has accelerated and that the predicted time is greater than the threshold time. Based on the determination that the predicted time is greater than the threshold time, the vehicle computing system determines to modify the vehicle trajectory 112 and yield to the object 104(1).

In some examples, the vehicle computing system may continuously and/or periodically (e.g., every 120 milliseconds, every 0.05 seconds, etc.) determine an updated threshold time associated with the merge operation of the vehicle 102 relative to the object 104(1). The vehicle computing system may additionally monitor object locations 118 of the object 104(1) over time to determine whether the predicted time associated with the object 104(1) traveling to the final merge location 126 is equal to or less than the updated threshold time.

In various examples, the vehicle computing system may continuously and/or periodically determine the updated threshold times until the vehicle 102 makes a final decision to merge. In some examples, the final decision to merge may include a determination to maintain the vehicle trajectory 112 when the vehicle is at or within a threshold distance of the initial merge location 124. In some examples, the threshold distance may include a distance required for the vehicle 102 to stop at a pre-determined negative acceleration (e.g., 1.5 meters per second$^2$, 3 meters per second$^2$, 2 feet per second$^2$, etc.). In such examples, the threshold distance may be determined based on the vehicle speed approaching the initial merge location 124. In some examples, the final decision to merge may be based on a determination that the vehicle 102 is at a second vehicle location 128(2), and therefore, is committed to merging in front of the object 104(1).

Additionally or in the alternative, the vehicle computing system may detect a second object 104(2) at an object location 130 and may determine that a second object trajectory 108(2) associated therewith (e.g., second object corridor) is a crossing trajectory (e.g., predicted object path crosses a planned vehicle path). The crossing trajectory may include a trajectory that crosses the vehicle trajectory 112 and/or the vehicle corridor 106. In various examples, based on a determination that the object trajectory 108(2) is a crossing trajectory, the vehicle computing system may determine an action for the vehicle 102 to perform utilizing the techniques described in U.S. patent application Ser. No. 16/856,996, filed Apr. 23, 2020 and entitled "Collision Avoidance for Vehicles with Right of Way," the entire contents of which are incorporated herein by reference.

In various examples, the vehicle computing system may determine that the second object trajectory 108(2) is a merging trajectory (e.g., merges with the vehicle trajectory 112). In such examples, the vehicle computing system may determine an initial merge location 124 associated with the vehicle trajectory 112 and the object trajectory 108(2) (e.g., between the vehicle corridor 106 and an object corridor 116 associated with the second object 104(2)) and/or a final merge location 126 associated with the vehicle 102 and the second object 104(2). The vehicle computing system may utilize the techniques described above to determine whether a threshold time associated with a second merge operation (e.g., between the vehicle 102 and the second object 104(2)) is greater than a predicted time associated with the second object reaching the final merge location.

In various examples, the vehicle computing system may determine the action to perform based on the time associated with the second merge operation. In various examples, the vehicle computing system may perform a most conservative operation between a determined action associated with the first merge operation and a second determined action associated with the second merge operation. For example, the vehicle computing system may determine to maintain the vehicle trajectory 112 with respect to the first object 104(1) and modify the vehicle trajectory 112 with respect to the second object 104(2). Based on a determination that at least one of the first merge operation or the second merge operation includes a modification to the vehicle trajectory 112, the vehicle computing system may determine to modify the vehicle trajectory and proceed behind the first object 104(1) and the second object 104(2).

Figure 2:
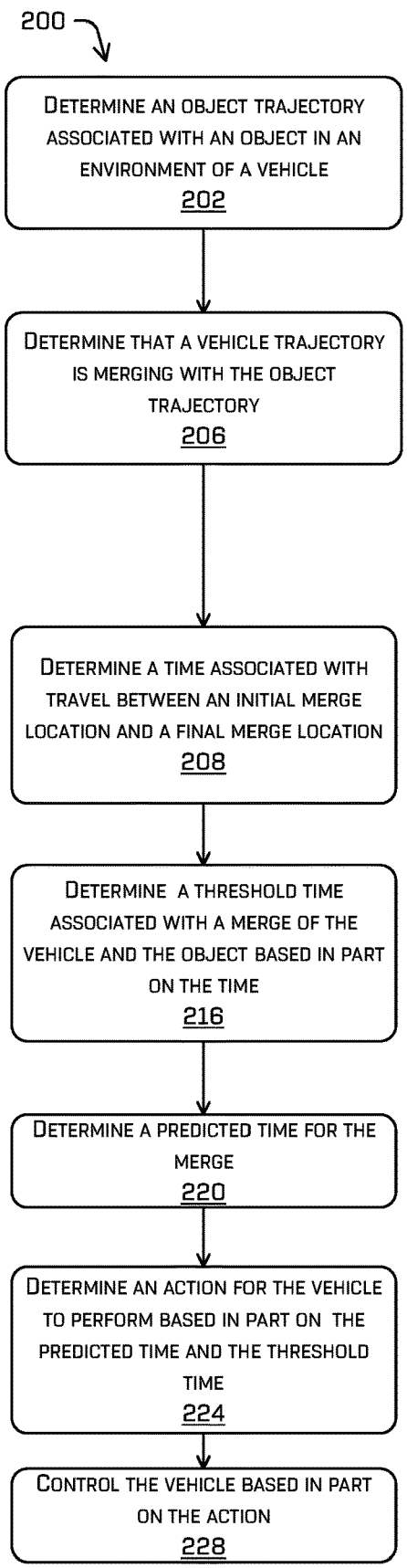
FIG. 2 depicts an example process for determining an action for a vehicle to perform to avoid a collision between the vehicle and an object in an environment based at least in part on a time associated with a merge operation of the vehicle in relation to the object, in accordance with examples of the disclosure.
Figure 2:
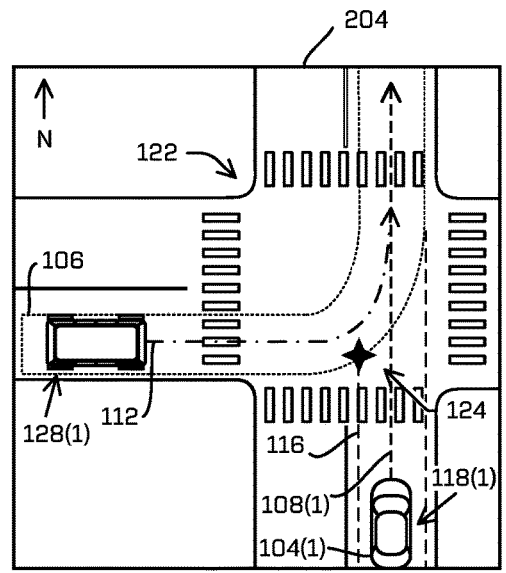
Figure 2:
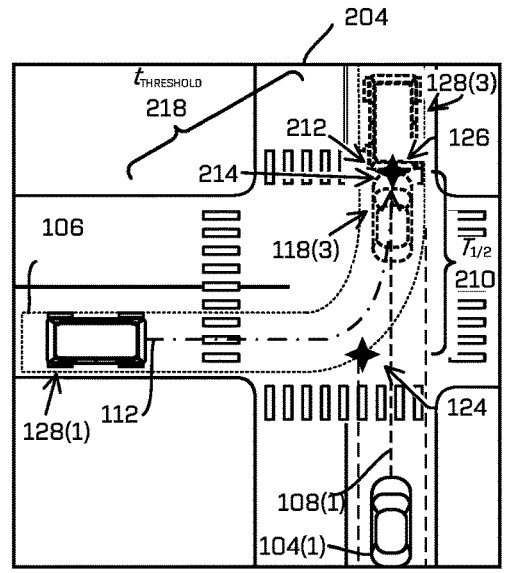
Figure 2:
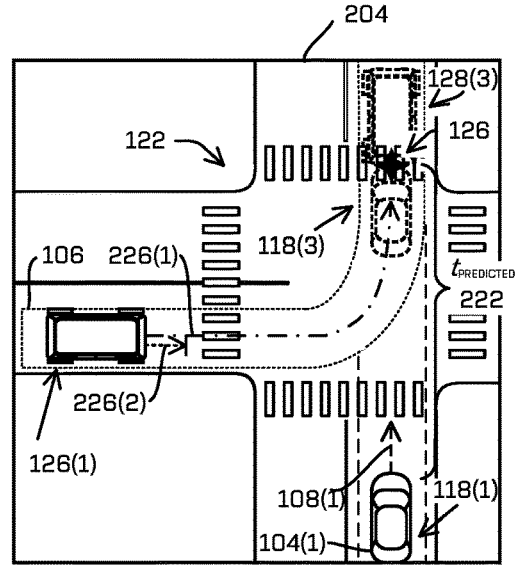

FIG. 2 depicts an example process 200 for determining an action for a vehicle 102 to perform to avoid a collision between the vehicle 102 and an object 104(1) in an environment 204, such as environment 100, based on a determination that a vehicle path and an object path merge.

At operation 202, the vehicle computing system determines an object trajectory 108(1) associated with the object 104(1). In various examples, the vehicle computing system may determine the object trajectory 108(1) (e.g., predicted path in which the object 104(1) may travel through the environment 204) based on sensor data from one or more sensors (e.g., lidar, radar, cameras, motion detectors, etc.). The sensors may include sensors mounted on the vehicle 102, another vehicle, and/or sensors mounted in the environment 204, such as sensors 114.

In some examples, the vehicle computing system may determine an object corridor 116 based in part on the object trajectory 108(1) and/or a current object location 118(1) (e.g., first object location 118(1)). In such examples, the vehicle computing system may be configured to determine the first object location 118(1) based at least in part on the sensor data. In various examples, the object corridor 116 may represent an area over which the object 104(1) may travel in the environment 204, such as based on the object trajectory 108(1). For example, the object corridor 116 represents the object 104 approaching the intersection 122 and continuing straight through the intersection 122.

In some examples, the area may be defined by a width of the object 104(1) and/or a buffer region (e.g., 1 foot, 1 meter, etc.) on either side of the object 104(1) and a distance in front of and/or behind the object 104. In various examples, the area may be determined based on an object type associated with the object 104(1). In such examples, the vehicle computing system may be configured to determine the object type associated with the object 104(1), such as based on sensor data.

At operation 206, the vehicle computing system determines that a vehicle trajectory 112 of the vehicle merges with the object trajectory 108(1). In various examples, the vehicle trajectory 112 may represent a planned path of the vehicle through the environment 204. In some examples, the vehicle trajectory 112 may include one or more speeds and/or directions of travel of the vehicle 102 through the environment 204. For example, the vehicle trajectory 112 may represent the vehicle 102 traveling from a first vehicle location 128(1) to the intersection 122, slowing down to turn left, modifying a direction of travel in the left turn, and accelerating to a speed appropriate for the environment. In at least one example, the vehicle trajectory 112 may include a planned trajectory, such as that stored in a database of the vehicle 102. In some examples, the vehicle computing system may determine a merge between the vehicle 102 and the object 104(1) based at least in part on an overlap between the vehicle trajectory 112 and the object trajectory 108(1). In such examples, the overlap may represent the vehicle trajectory 112 and the object trajectory 108(1) sharing a direction of travel over a same portion of a road (e.g., lane, etc.).

In some examples, the vehicle computing system may determine that the vehicle trajectory 112 and the object trajectory 108(1) merge based on a determination that the object corridor 116 merges with the vehicle corridor 106 in the intersection 122. In some examples, the vehicle computing system may determine that the object trajectory 108(1) is a merging trajectory. In some examples, the determination of the merging trajectory may be based on the determination that the object corridor 116 merges with the vehicle corridor 106 and/or that at least one future direction associated with the vehicle trajectory 112 substantially matches (e.g., within 0.1 degree, 0.5 degrees, etc.) at least one future direction associated with the object trajectory 108(1). For example, the vehicle computing system may determine that a future direction associated with the vehicle trajectory 112 is substantially north (N) and that a future direction associated with the object trajectory 108(1) is also substantially north. In various examples, the merge may be determined based at least in part on the vehicle 102 and object 104(1) occupying a same lane at any time in the future.

In various examples, the vehicle computing system may determine an initial merge location 124 associated with the merge operation of the vehicle 102 relative to the object 104(1). In some examples, the initial merge location 124 may represent a hypothetical location at which a rear portion of the vehicle 102 may be proximate to and ahead of a front portion of the object 104, such that it represents an initial point of merge between the vehicle 102 and the object 104. In some examples, the initial merge location 124 may be proximate to and/or within a threshold distance (e.g., 3 feet, 0.5 meters, ½ vehicle width, etc.) of an intersection of the vehicle corridor 106 and the object corridor 116. In various examples, the initial merge location 124 may be proximate to and/or within a threshold distance of a location at which the vehicle trajectory 112 merges with the object trajectory 108, or vice versa. In some examples, the initial merge location 124 may represent a first location at which the vehicle 102 and the object 104(1) could potentially collide.

At operation 208, the vehicle computing system determines a time 210 ($t_{1/2}$, determined utilizing equation (7) above) between the initial merge location 124 and a final merge location 126. The final merge location 126 may represent a hypothetical location in the environment 204 at which the rear portion of the vehicle 212 and the front portion of the object 214 are at a closest point of approach without a collision, such that the vehicle 102 and object 104(1) safely merge without colliding. In some examples, the final merge location 126 may represent the closest point of approach at which the vehicle trajectory 112 (e.g., planned path) and the object trajectory 108(1) (e.g., predicted path) overlap and a vehicle speed and an object speed substantially match (e.g., within 0.3 meters per second, 2 feet per second, etc.). For example, the final merge location 126 may represent a point at which a rear bumper of the vehicle 212 is a distance (e.g., 0.1 inches, 0.5 feet, 0.5 meters, etc.) from a front bumper of the object 214, with an object speed substantially matching a vehicle speed.

In various examples, the vehicle computing system may determine the time 210 utilizing one or more of equations (3)-(10) described above with respect to FIG. 1. In such examples, the time 210 may represent a time associated with the vehicle 102 and/or the object 104(1) traveling from the initial merge location 124 to the final merge location 126. In various examples, the time 210 may be determined based on an object speed of the object 104(1) at the initial merge location 124 and/or a vehicle speed of the vehicle 102 at the initial merge location 124.

In various examples, the time 210 may be determined based on a predetermined positive acceleration of the vehicle 102 and a predetermined negative acceleration of the object 104(1). In some examples, one or more of the predetermined positive acceleration or the predetermined negative acceleration may include constant values. In some examples, the positive acceleration and the negative acceleration may include a same absolute value, such that the vehicle 102 speeds up at a same rate over time that the object 104(1) slows down.

In various examples, the vehicle computing system may determine two values associated with the time 210 (e.g., two different times represent the final merge location 126). In such examples, the vehicle computing system may determine that, based on the object speed at the initial merge location 124 and the vehicle speed at the initial merge location 124, the object 104(1) would overtake the vehicle 102 prior to the vehicle 102 accelerating to a speed that is substantially the same as a speed of the object 104(1) at a location beyond the initial merge location 124. In various examples, the vehicle computing system may determine that the two values associated with the time 210 represents that a collision between the vehicle 102 and the object 104(1) would occur if the vehicle 102 proceeded with the merge operation. In some examples, based on a determination that the time 210 includes two values, the vehicle computing system may determine to modify the vehicle trajectory 112 and yield to the object 104(1).

In various examples, the vehicle computing system may determine that the time 210 has a value of 0. In such examples, the vehicle computing system may determine that a probability of collision between the vehicle 102 and the object 104(1) is less than a threshold probability. In at least one example, the time 210 value of 0 indicates that the vehicle 102 can safely merge with the object 104(1) without a risk of collision between the vehicle 102 and the object 104(1). In some examples, based on a determination that the time 210 has a value of 0, the vehicle computing system may determine to maintain the vehicle trajectory and merge ahead of the object 104(1).

At operation 216, the vehicle computing system determines a threshold time 218 ($t_{threshold}$) associated with the merge operation of the vehicle 102 relative to the object 104(1). In some examples, the threshold time 218 may represent a time associated with the vehicle traveling from the first vehicle location 128(1) to the third vehicle location 128(3) associated with a final merge location 126. In such examples, the threshold time 218 may include a first time associated with the vehicle 102 traveling from the first vehicle location 128(1) to the initial merge location 124 plus the time 210.

At operation 220, the vehicle computing system may determine a predicted time 222 ($t_{predicted}$) for the merge operation. In some examples, the predicted time 222 for the merge operation may represent a time associated with the object traveling from the first object location 118(1) to the third object location 118(3). In various examples, the predicted time 222 may be based on an object speed associated with the first object location 118(1). In such examples, the predicted time 222 may include a time for the object to travel from a current location at a current speed to the third object location 118(3) associated with the final merge location 126, such as with no acceleration. In some examples, the vehicle computing system may determine the predicted time 222 based on a positive acceleration (e.g., 1.2 meter per second$^2$, 2.5 feet per second$^2$, etc.). In such examples, the vehicle computing system may account for the object 104(1) detecting the vehicle 102 and/or a merging trajectory associated therewith and accelerating to travel ahead of the vehicle 102 through the environment 204.

At operation 224, the vehicle computing system may determine an action 226 for the vehicle 102 to perform based at least in part on the predicted time 222 and the threshold time 218. The action 226 may include a first action 226(1) to maintain a vehicle trajectory, such as vehicle trajectory 112. In some examples, the first action 226(1) may represent a determination to not yield to the object 104(1). The action 226 may include a second action 226(2) comprising a decrease in a speed associated with the vehicle 102 (e.g., slowing action). In such examples, the second action 226 (2) may include a modification to a speed associated with the vehicle trajectory 112. In various examples, the modification may include the vehicle slowing to a stopped position prior to entering the intersection 122.

In various examples, based on a determination that the predicted time is substantially equal to (e.g., within a second threshold time (e.g., 0.2 seconds, 0.3 seconds, etc.) greater or less than)) the threshold time. In such examples, the vehicle computing system may determine to modify the vehicle trajectory 112 to accelerate at an increased rate (e.g., more than the predetermined acceleration associated with the calculations described above), such as to merge ahead of the object 104(1). In various examples, the increased acceleration may include an acceleration within a range between the predetermined acceleration and a maximum acceleration (e.g., 3 meters per second$^2$, etc.).

In various examples, based on a determination that the predicted time 222 is less than or equal to the threshold time 218, the vehicle computing system may determine to cause the vehicle to perform the first action 226(1) (e.g., maintain the vehicle trajectory). In some examples, the predicted time 222 being equal to or less than the threshold time 218 may represent a safe merge between the vehicle 102 and the object 104(1), such that a collision will not occur (e.g., a probability of collision below a threshold).

In various examples, based on a determination that the predicted time 222 is equal to or greater than the threshold time 218, the vehicle computing system may determine to cause the vehicle to perform the second action 226(2), such as by modifying the vehicle trajectory 112 to yield to the object 104(1).

In various examples, based on a determination that the predicted time 222 is equal to the threshold time 218, the vehicle computing system may determine a cost associated with the first action 226(1), the second action 226(2), and/or another action (e.g., acceleration to merge ahead of the object 104(1)). The cost may be determined based on safety (e.g., avoiding a collision between the vehicle 102 and the object 104(1)), comfort (e.g., lack of abrupt movements), progress (e.g., movement toward destination), operating rules (e.g., rules of the road, laws, codes, regulations, etc.), or the like, such as that described in U.S. patent application Ser. No. 16/539,928, incorporated herein by reference above. The vehicle computing system may select the action for the vehicle 102 to perform based on an optimal cost (e.g., lowest cost, highest cost, a cost being below a threshold, etc.) being associated therewith.

At operation 228, the process may include controlling the vehicle based in part on the action. As will be discussed in detail with regard to FIG. 4, the vehicle computing system may control the vehicle utilizing one or more drive systems and/or other components associated with the vehicle computing system.

Figure 3:
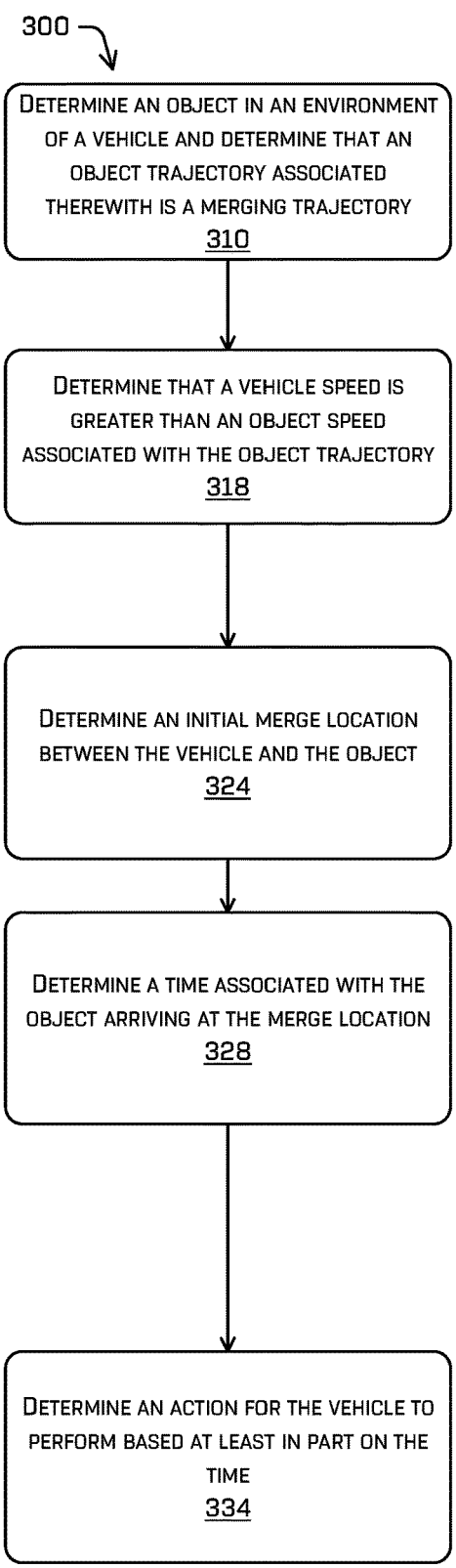
FIG. 3 depicts an example process for determining an action for a vehicle to perform to avoid a collision between the vehicle and an object in an environment based at least in part on a vehicle speed of the vehicle traveling through the environment, in accordance with examples of the disclosure.
Figure 3:
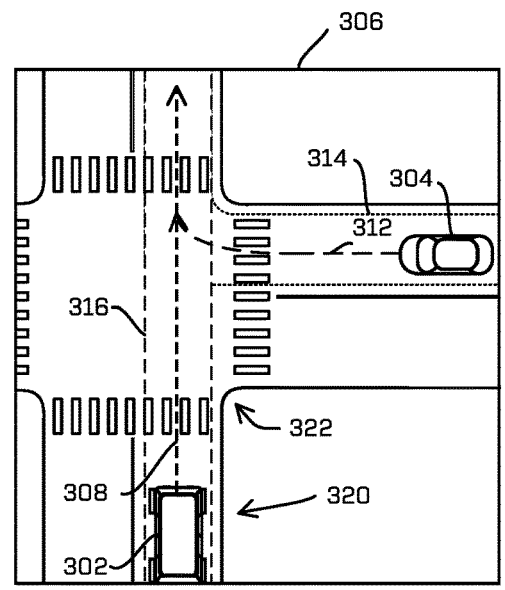
Figure 3:
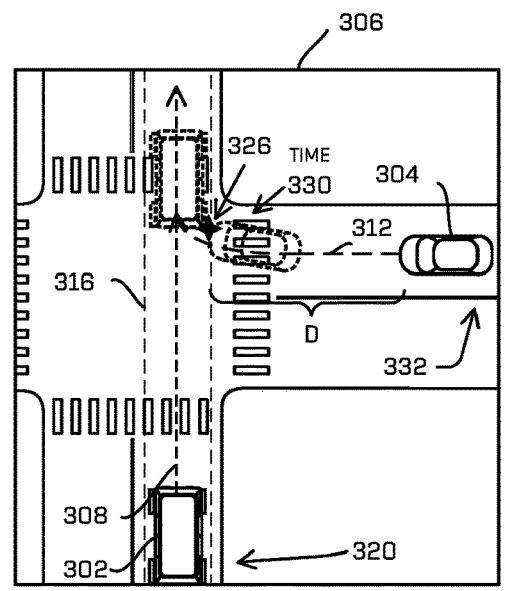
Figure 3:
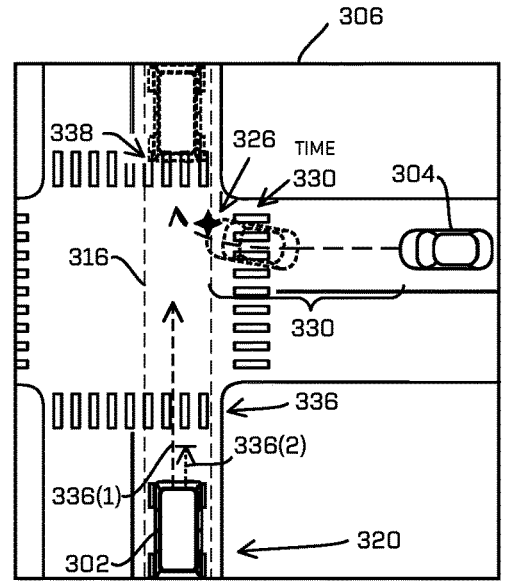

FIG. 3 depicts an example process 300 for determining an action for a vehicle 302 to perform to avoid a collision between the vehicle 302, such as vehicle 102, and an object 304, such as object 104, in an environment 306, such as environment 100, based at least in part on a vehicle speed associated with a vehicle trajectory 308, such as vehicle trajectory 112, of the vehicle 302.

At operation 310, a vehicle computing system may determine the object 304 in the environment 306 of the vehicle 302 and determine that an object trajectory 312, such as object trajectory 108, associated therewith is a merging trajectory. In various examples, the vehicle computing system may determine the object 304 based on sensor data received from one or more sensors. The sensors may be mounted on the vehicle 302, mounted on other vehicles in communication, directly or indirectly, with the vehicle 302, and/or sensors mounted in the environment 306.

As discussed above, the vehicle computing system may be configured to determine the object trajectory 312 based on the sensor data. In some examples, the vehicle computing system may determine an object type associated with the object. In such examples, the object trajectory 312 may be determined based at least in part on the object type.

In various examples, a determination that the object trajectory 312 is a merging trajectory is based in part on a determination that the predicted object trajectory 312 is merging with the vehicle trajectory 308, such that a future direction of travel of the object 304 substantially matches a future direction of travel of the vehicle 302.

In various examples, the vehicle computing system may determine that the merging trajectory based on a determination that an object corridor 314, such as object corridor 116, associated with the object trajectory 312 substantially overlaps at least a portion of a vehicle corridor 316, such as vehicle corridor 106, associated with the vehicle trajectory 308.

At operation 318, the vehicle computing system may determine that a vehicle speed is greater than an object speed associated with the object trajectory 312. The vehicle speed may include a speed associated with the vehicle 302 at a current location 320 and/or at another location at which the vehicle 302 plans to be at a time in the future, such as following the vehicle trajectory 308.

In various examples, the vehicle computing system may determine the object speed based on the sensor data received from the one or more sensors. In such examples, the object speed may be referred to as ($v_{object,sensor}$). In some examples, the vehicle computing system may determine the object speed based on a road speed associated with the environment 306. In such examples, the vehicle computing system may determine the object speed ($v_{object,max}$) based on a speed limit or the speed limit plus a buffer (e.g., +6 miles per hour, 4 kilometers per hour, etc.).

In some examples, the vehicle computing system may determine the object speed based on a maximum lateral acceleration of the object 304 based on a curvature (k) of a road in the environment 306 and/or a curvature (k) corresponding to a maneuver associated with the object trajectory 312. In such examples, the object speed may be referred to as ($v_{object,curvature,k}$). For example, the vehicle computing system may determine that the object trajectory 312 includes a right turn at an intersection 322, to merge into a path of the vehicle 302. The vehicle computing system may determine the object speed based on the maximum lateral acceleration of the object in the right turn. In various examples, the vehicle computing system may determine the object speed utilizing equation (1) described above.

In various examples, the vehicle computing system may determine the object speed based on a minimum value of the ($v_{object,sensor}$), ($v_{object,max}$), and/or the ($v_{object,curvature,k}$). In some examples, the object speed may include a lowest speed of the sensor speed, maximum road speed, and the fastest maneuvering speed associated with the object trajectory 312. In some examples, the object speed may include a fastest speed of the sensor speed, maximum road speed, and the fastest maneuvering speed associated with the object trajectory 312.

At operation 324, the vehicle computing system may determine an initial merge location 326 between the vehicle 302 and the object 304. The initial merge location 326 may represent a hypothetical location at which a rear portion of the vehicle 302 may be proximate to and ahead of a front portion of the object 304, such that it represents an initial point of merge between the vehicle 302 and the object 304. In various examples, the vehicle computing system may determine the initial merge location 326 based on one or more of the vehicle trajectory 308, the object trajectory 312, the vehicle corridor 316, the object corridor 314.

At operation 328, the vehicle computing system determines a time 330 associated with the object arriving at the initial merge location 326. In various examples, the time 330 may be determined based on a distance (D) between the object location 332 and the merge location 326. In some examples, time 330 may be determined based the object speed associated with the object trajectory 312. In such examples, the time 330 may represent a time for the object 304 to travel the distance (D) at the object speed. In some examples, the time 330 may represent a time for the object 304 to travel the distance (D) starting at the object speed and slowing to a speed associated with a maneuver to merge with the vehicle 302. For examples, the time 330 may represent a time for the object 304 to travel the distance (D) starting at a first speed, such as that determined based on sensor data ($v_{object,sensor}$), and slowing to a second object speed ($v_{object,curvature,k}$) associated with the right turn at the intersection 322.

At operation 334, the vehicle computing system may determine an action 336 for the vehicle to perform based at least in part on the time. The action 336 may include a first action 336(1) to maintain a vehicle trajectory, such as vehicle trajectory 308. In some examples, the first action 336(1) may represent a determination to not yield to the object 304. The action 336 may include a second action 336(2) comprising a decrease in a speed associated with the vehicle 302 (e.g., slowing action). In such examples, the second action 336(2) may include a modification to a speed associated with the vehicle trajectory. In various examples, the modification may include the vehicle slowing to a stopped position, such as prior to entering the intersection 322.

In some examples, the vehicle computing system may determine the action 336 for the vehicle to perform based on whether the vehicle 302 traveling on the vehicle trajectory 308 at the vehicle speed, will be beyond the initial merge location 326 by the time 330. In some examples, the vehicle computing system may determine whether a rear portion of the vehicle 338 will be beyond the initial merge location by the time 330.

In various examples, based on a determination that the vehicle 302 will be beyond the initial merge location 326 at the time 330, the vehicle computing system may control the vehicle 302 according to the first action 336(1), maintaining the vehicle trajectory. Based on a determination that the vehicle 302 will not be beyond the initial merge location 326 at the time 330, the vehicle computing system may perform control the vehicle 302 according to the second action 336(2), yielding to the object 304.

In various examples, based on a determination that the vehicle 302 and/or the rear portion of the vehicle 338 will be at the initial merge location at the time 330, the vehicle computing system may determine a first cost associated with the first action 336(1) and a second cost associated with the second action 336(2). In some examples, the vehicle computing system may determine a third cost associated with a third action (not illustrated), such as a third action to accelerate to ensure the vehicle 302 is beyond the initial merge location 326 by the time 330.

In various examples, the cost may be determined based on safety (e.g., avoiding a collision between the vehicle 302 and the object 304), comfort (e.g., lack of abrupt movements), progress (e.g., movement toward destination), operating rules (e.g., rules of the road, laws, codes, regulations, etc.), or the like, such as that described in U.S. patent application Ser. No. 16/539,928, incorporated herein by reference above. The vehicle computing system may select the action for the vehicle 302 to perform based on an optimal cost (e.g., lowest cost, highest cost, a cost being below a threshold, etc.) being associated therewith.

By utilizing the techniques described herein, the vehicle computing system may enhance the safety of the vehicle operation by ensuring that a collision will not occur during a merge operation of the vehicle 302 relative to the object 304. Accordingly, the techniques described herein improve current merging techniques.

Figure 4:
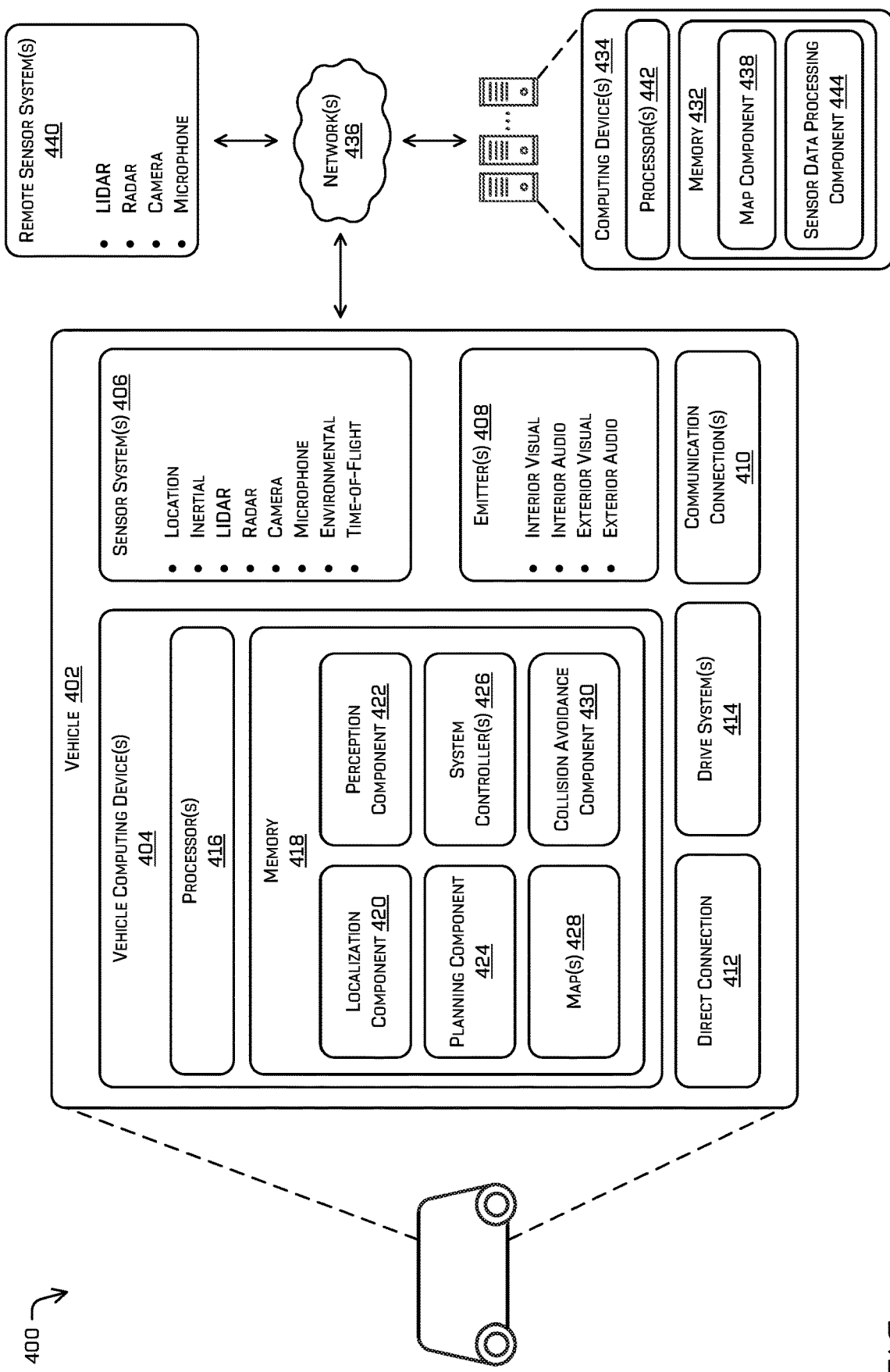
FIG. 4 is a block diagram of an example system for implementing the techniques described herein.

FIG. 4 is a block diagram of an example system 400 for implementing the techniques described herein. In at least one example, the system 400 may include a vehicle 402, such as vehicle 102.

The vehicle 402 may include one or more vehicle computing devices 404, such as the vehicle computing systems described herein, one or more sensor systems 406, one or more emitters 408, one or more communication connections 410, at least one direct connection 412, and one or more drive systems 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428, and a safety component 430. Though depicted in FIG. 4 as residing in the memory 418 for illustrative purposes, it is contemplated that the localization component 420, a perception component 422, a planning component 424, one or more system controllers 426, one or more maps 428, and a safety component 430 may additionally, or alternatively, be accessible to the vehicle 402 (e.g., stored on, or otherwise accessible by, memory remote from the vehicle 402, such as, for example, on memory 432 of a remote computing device 434).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for generating a path polygon (e.g., vehicle corridor) associated with the vehicle path, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object (e.g., object speed), an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. In some examples, the planning component 424 may determine a vehicle corridor associated with vehicle 402 travel through the environment, such as vehicle corridor 106. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle 402 along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like): spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect objects in an environment, and/or generate routes and/or trajectories to navigate within an environment.

In various examples, the map(s) 428 may be utilized by the vehicle computing device 404 to determine a right of way, such as at an intersection. The right of way may indicate an entity (e.g., the vehicle 402 or an object) that has priority at the intersection or other junction. In various examples, the map(s) 428 may indicate the right of way based on a vehicle location, direction of travel, object location, object direction of travel, object predicted trajectory, or the like.

In some examples, the one or more maps 428 may be stored on a remote computing device(s) (such as the computing device(s) 434) accessible via network(s) 436, such as in map component 438. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device 404 may include a safety component 430. The safety component 430 may be configured to determine, based at least in part on detected object location and/or trajectories, an action for the vehicle to take. As described above with regard to FIGS. 1-3, the safety component 430 may be configured to determine whether to cause the vehicle 402 to yield to an object traveling on a merging path with a path of the vehicle 402 (e.g., modify a vehicle trajectory). Based on a determination of whether to yield, the safety component 430 may send the planning component 424 a signal to maintain or modify a vehicle trajectory. For example, the safety component 430 may determine that the vehicle can safely merge with the object without a potential for collision (e.g., probability of collision below a threshold) and that the vehicle may maintain a vehicle trajectory. The safety component 430 may provide a signal to the planning component 424 to cause the vehicle to maintain the vehicle trajectory. For another example, the safety component 430 may determine that the vehicle, traveling faster than an object, will be beyond an initial merge location between the vehicle and the object and may maintain the vehicle trajectory. The safety component 430 may provide a signal to the planning component 424 to cause the vehicle to maintain the vehicle trajectory through the initial merge location.

As can be understood, the components discussed herein (e.g., the localization component 420, the perception component 422, the planning component 424, the one or more system controllers 426, the one or more maps 428, and the safety component 430 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 432, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally or in the alternative, the sensor system(s) 406 may send sensor data, via the one or more networks 436, to the one or more computing device(s) 434 at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 434, other nearby vehicles, etc.) and/or one or more remote sensor system(s) 440 for receiving sensor data.

The communications connection(s) 410 may include physical and/or logical interfaces for connecting the vehicle computing device 404 to another computing device or a network, such as network(s) 436. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the safety component 430 and various components thereof, may process sensor data, as described above, and may send their respective outputs, over the one or more network(s) 436, to the computing device(s) 434. In at least one example, the localization component 420, the perception component 422, the planning component 424, the one or more system controllers 426, the one or more maps 428, and the safety component 430 may send their respective outputs to the computing device(s) 434 at a particular frequency, after a lapse of a predetermined period of time, in near real-time, etc.

In some examples, the vehicle 402 may send sensor data to the computing device(s) 434 via the network(s) 436. In some examples, the vehicle 402 may receive sensor data from the computing device(s) 434 via the network(s) 436. The sensor data may include raw sensor data and/or processed sensor data and/or representations of sensor data. In some examples, the sensor data (raw or processed) may be sent and/or received as one or more log files.

The computing device(s) 434 may include processor(s) 442 and a memory 432 storing the map component 438 and a sensor data processing component 444. In some examples, the map component 438 may include functionality to generate maps of various resolutions. In such examples, the map component 438 may send one or more maps to the vehicle computing device 404 for navigational purposes. In various examples, the sensor data processing component 444 may be configured to receive data from one or more remote sensors, such as sensor systems 406 and/or remote sensor system(s) 440. In some examples, the sensor data processing component 444 may be configured to process the data and send processed sensor data to the vehicle computing device(s) 404, such as for use by the safety component 430. In some examples, the sensor data processing component 444 may be configured to send raw sensor data to the vehicle computing device(s) 404.

The processor(s) 416 of the vehicle 402 and the processor(s) 442 of the computing device(s) 434 may be any suitable processor capable of executing instructions to process data and perform operations as described herein. By way of example and not limitation, the processor(s) 416 and 442 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 432 are examples of non-transitory computer-readable media. The memory 418 and 432 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 432 may include at least a working memory and a storage memory. For example, the working memory may be a high-speed memory of limited capacity (e.g., cache memory) that is used for storing data to be operated on by the processor(s) 416 and 442. In some instances, the memory 418 and 432 may include a storage memory that may be a lower-speed memory of relatively large capacity that is used for long-term storage of data. In some cases, the processor(s) 416 and 442 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 434 and/or components of the computing device(s) 434 may be associated with the vehicle 402. That is, the vehicle 402 may perform one or more of the functions associated with the computing device(s) 434, and vice versa.

Figure 5:
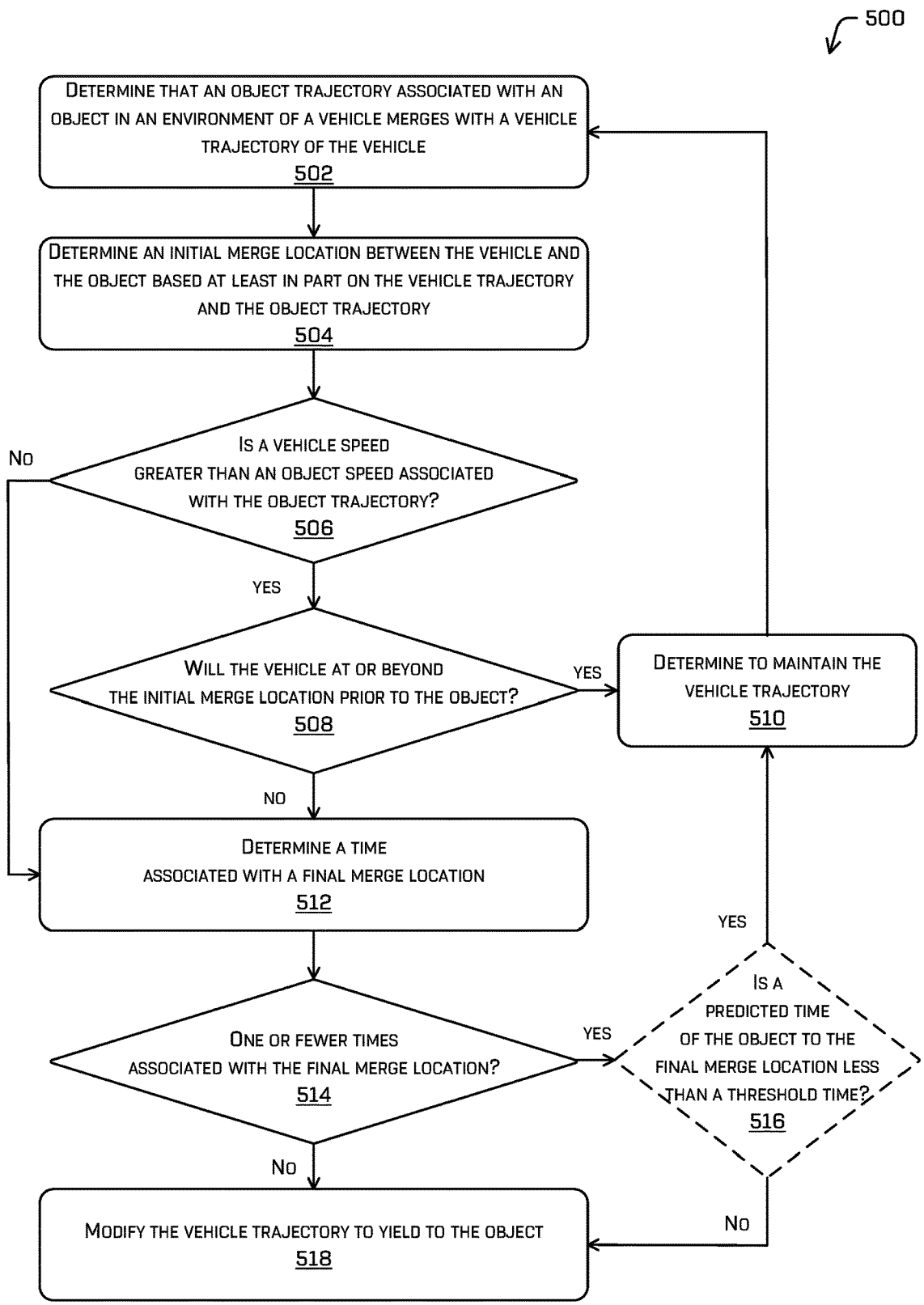
FIG. 5 depicts an example process for determining an action for a vehicle to perform to avoid a collision between the vehicle and an object in an environment, in accordance with examples of the disclosure.

FIGS. 2, 3, and 5 illustrate example processes in accordance with examples of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 depicts an example process 500 for determining an action to perform to avoid a collision between a vehicle and an object in an environment, in accordance with examples of the disclosure. For example, some or all of the process 500 may be performed by one or more components in FIG. 4, as described herein. For example, some or all of the process 500 may be performed by the vehicle computing device(s) 404.

At operation 502, the process may include determining that an object trajectory associated with an object in an environment of a vehicle merges with a vehicle trajectory of the vehicle. In various examples, the vehicle computing system may determine the object trajectory (e.g., predicted path in which the object may travel through the environment) based on sensor data from one or more sensors (e.g., lidar, radar, cameras, motion detectors, etc.). The sensors may include sensors mounted on the vehicle, another vehicle, and/or sensors mounted in the environment.

In various examples, the vehicle computing system may determine that the object trajectory merges with the vehicle trajectory based on a determination that a future direction of travel associated with the object trajectory substantially matches (e.g., within 3 degrees, 5 degrees, etc.) a future direction of travel associated with the vehicle trajectory. For example, the vehicle computing system may determine the merging trajectory based on a determination that the object trajectory includes the object traveling west and making a right-hand turn at an intersection to travel north, while the vehicle trajectory includes the vehicle traveling north through the intersection.

In some examples, the vehicle computing system may determine an object corridor based in part on the object trajectory and/or a current object location. In such examples, the vehicle computing system may be configured to determine the first object location based at least in part on the sensor data. In various examples, the object corridor may represent an area over which the object may travel in the environment, such as based on the object trajectory. In some examples, the vehicle computing system may determine that the object trajectory merges with the vehicle trajectory based on a determination that an area associated with a vehicle corridor and an area associated with the object corridor overlap at a time in the future.

At operation 504, the process may include determining an initial merge location between the vehicle and the object based at least in part on the vehicle trajectory and the object trajectory. In some examples, the initial merge location may represent a hypothetical location at which a rear portion of the vehicle (e.g., rear bumper) may be proximate to and ahead of a front portion of the object (e.g., front bumper), such that it represents an initial point of merge between the vehicle and the object. In some examples, the initial merge location may represent an initial location at which the vehicle and the object may collide.

In various examples, the initial merge location may include a location proximate to or within a threshold distance (e.g., 2.5 feet, 0.6 meters, ⅓ vehicle width, etc.) of an intersection of a vehicle corridor and an object corridor. In various examples, the initial merge location may be proximate to and/or within a threshold distance of a location at which the vehicle trajectory merges with the object trajectory, or vice versa.

At operation 506, the process may include determining whether a vehicle speed is greater than an object speed associated with the object trajectory. In some examples, the vehicle speed may represent a current speed of the vehicle at a current time. In some examples, the vehicle speed may represent a future speed of the vehicle, such as based on a speed change associated with the planned vehicle trajectory.

In various examples, the vehicle computing system may determine the object speed based on the sensor data received from the one or more sensors in the environment (e.g., on the vehicle, another vehicle, or mounted in the environment). In some examples, the object speed based on the sensor data may be referred to as ($v_{object,sensor}$). In some examples, the vehicle computing system may determine a maximum objet speed ($v_{object,max}$) of the object based on a road speed associated with the environment. In such examples, the vehicle computing system may determine the object speed based on a speed limit or the speed limit plus a buffer (e.g., +5 miles per hour, 5 kilometers per hour, etc.).

In some examples, the vehicle computing system may determine that the object is traveling on a curved road. In such examples, the vehicle computing system may determine the object speed ($v_{object,curvature,k}$) based on a maximum lateral acceleration associated with a reference line absolute curvature of the road $|k_{road,0}|$ proximate an initial merge location between the vehicle trajectory and the object trajectory. In various examples, the object speed on a curved road may be represented by equation (1) above.

In various examples, the vehicle computing system may determine the object speed based on a minimum or maximum value between the ($v_{object,sensor}$), ($v_{object,max}$), and/or ($v_{object,curvature,k}$). In such examples, the vehicle computing system may determine that the object speed includes the lowest or highest value of the ($v_{object,sensor}$), ($v_{object,max}$), and/or ($v_{entity,curvature,k}$).

Based on a determination that the vehicle speed is greater than the object speed ("Yes" at operation 506), the process, at operation 508 may include determining whether the vehicle will be at or beyond the initial merge location prior to the object. In various examples, the vehicle computing system may determine a first time associated with the vehicle traveling to the initial merge location based on the vehicle trajectory. In such examples, the first time may represent a time associated with the rear portion of the vehicle being at or proximate (e.g., within a threshold distance (e.g., 0.5 meters, 1 foot, etc.) to the initial merge location. In some examples, the vehicle computing system may determine a second time associated with the object traveling to the initial merge location based on the object trajectory. In such examples, the second time may represent a time associated with the front portion of the object being at or proximate to the initial merge location. In various examples, the vehicle computing system may determine whether the vehicle will be at or beyond the initial merge location prior to the object based on a determination that the first time is less than or equal to the second time.

Based on a determination that the vehicle will be at or beyond the initial merge location prior to the object ("Yes" at operation 508), the process, at operation 510 may include determining to maintain a vehicle trajectory. In various examples, a determination to maintain the vehicle trajectory may include a determination to not yield to the object with the merging trajectory. In various examples, the vehicle computing system may control the vehicle according to the vehicle trajectory.

Based on a determination that the vehicle speed is equal to or less than the object speed ("No" at operation 506) or that the vehicle will not be at or beyond the initial merge location prior to the object ("No" at operation 508), the process, at operation 512 may include determining a time associated with a final merge location (e.g., $t_{1/2}$ described above with regard to equation (7)). In various examples, the time may represent a time for a vehicle and/or an object to travel from the initial merge location to the final merge location. In various examples, the final merge location may represent a hypothetical location at which a rear portion of the vehicle is proximate to and ahead of a front portion of the object. For example, a rear bumper of the vehicle is proximate to and ahead of a front bumper of the object.

In various examples, the time may be determined based on the vehicle speed and/or the object speed. In various examples, the time may be determined based on a predetermined positive acceleration of the vehicle or the object and/or a predetermined negative acceleration of the vehicle or the object. In some examples, the predetermined positive acceleration and the predetermined negative acceleration may include a same absolute value. In some examples, the predetermined positive acceleration and the predetermined negative acceleration may include different values.

At operation 514, the process may include determining whether one or fewer times are associated with the final merge location. In various examples, the vehicle computing system may determine whether one or fewer times are associated with the final merge location utilizing equations (3)-(9), described above. In various examples, a determination that two (2) times are associated with the final merge location may represent a collision (e.g., front bumper of the object travels beyond the final merge location and back to the final merge location).

Based on the determination that two (2) times are associated with the final merge location ("No" at operation 514), the process, at operation 516 may include determining to modify the vehicle trajectory to yield to the object. In various examples, a modification of the vehicle trajectory may include a change to the one or more vehicle speeds associated therewith, such as to slow a forward movement and/or stop in order to permit the object to proceed ahead of the vehicle.

Based on the determination that one or fewer times are associated with the final merge location ("Yes" at operation 514), the process, at operation 518 may include determining whether a predicted time associated with the object traveling to the final merge location is less than a threshold time. In some examples, the operation 518 may be optional, based on a determination that a single time is determined at operation 514. In various examples, the threshold time may include a time associated with the vehicle merging into the object path (or vice versa) and modifying a speed as appropriate for the environment. In various examples, the threshold time may include a time associated with the vehicle traveling from a current location to the final merge location, according to the one or more speeds associated with the vehicle trajectory.

In various examples, the predicted time may include a time associated with the object traveling from a current location to the final merge location at the object speed. In various examples, the predicted time may represent a fastest time at which the object may travel to the final merge location. In some examples, the vehicle computing system may include an additional time buffer to the calculated time to the final merge location based on the object speed. In some examples, the time buffer may include a fixed value (e.g., 0.2 seconds, 0.3 seconds, etc.) added to a calculated time for the object to travel from the current object location to the final merge location. In some examples, the time buffer may be calculated utilizing one or more positive accelerations (e.g., 1 foot per second$^2$, 0.5 meters per second$^2$, etc.) applied to one or more portions of the distance between the current object location and the final merge location, or the like. In such examples, the vehicle computing system may account for the object accelerating during at least a portion of the distance between the current object location and the final merge location, such as to accelerate to merge ahead of the vehicle. In various examples, the predicted time and/or the safety buffer may ensure that the vehicle computing device maximizes safe operation of the vehicle in the environment.

Based on a determination that the predicted time associated with the object traveling to the final merge location is equal to or less than the threshold time ("Yes" at operation 516) or determining that no time are associated with the final merge location (e.g., time $t_{1/2}$ calculated is zero), the process may include determining to maintain the vehicle trajectory, such as that described at operation 510.

Based on a determination that the predicted time associated with the object traveling to the final merge location is equal to or greater than the threshold time ("No" at operation 516), the process may include determining to modify the vehicle trajectory to yield to the object, such as that described at operation 514.

In various examples, based on a determination that the predicted time is equal to the threshold time, the vehicle computing system may determine a cost associated with a first action (e.g., maintaining the vehicle trajectory), a second cost associated with a second action (e.g., modifying the vehicle trajectory to yield), and/or a third action (e.g., modifying the vehicle trajectory to accelerate ahead of the object). The cost may be determined based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like, such as that described in U.S. patent application Ser. No. 16/539,928, incorporated herein by reference above. The vehicle computing system may select the action for the vehicle to perform based on an optimal cost (e.g., lowest cost, highest cost, a cost being below a threshold, etc.) being associated therewith.

Example Clauses

A. A system comprising: one or more processors: and one or more non-transitory computer-readable media storing instructions executable by the one or more processors, wherein the instructions, when executed, cause the system to perform operations comprising: determining, based at least in part on sensor data from a sensor associated with a vehicle, a predicted path of an object through an environment proximate the vehicle: determining that the predicted path and a planned path of the vehicle trajectory of the vehicle merge at an initial merge location: determining a threshold time for a merge operation of the vehicle relative to the object, wherein the threshold time represents an amount of time for the vehicle to travel from a current vehicle location of the vehicle to a final merge location associated with the merge operation, wherein the final merge location represents a location at which the predicted path overlaps the planned path and a vehicle speed of the vehicle is within a threshold speed of an object speed of the object: determining a predicted time for the object to travel from a current object location of the object to the final merge location: determining an action for the vehicle to perform based at least in part on a difference between the predicted time and the threshold time: and controlling the vehicle based at least in part on the action.

B. The system of paragraph A, wherein determining the action for the vehicle to perform comprises at least one of: determining to maintain a vehicle trajectory: or determining to modify the vehicle trajectory to yield to the object.

C. The system of either paragraph A or paragraph B, wherein determining the threshold time for the merge operation comprises: determining a first time associated with the final merge location, wherein the first time represents a first amount of time associated with at least one of the vehicle or the object traveling from the initial merge location to the final merge location: and determining a second time associated with the initial merge location, wherein the second time represents a second amount of time associated with the vehicle traveling from the current vehicle location to the initial merge location, wherein the threshold time is based at least in part on the first time and the second time.

D. The system of paragraph C, wherein the first time is based at least in part on at least one of: the vehicle speed of the vehicle at the initial merge location: the object speed of the object at the initial merge location: a positive acceleration of the vehicle: or a negative acceleration of the object.

E. The system of any one of paragraphs A-D, wherein the operations further comprise: determining a first time and a second time associated with the object traveling from the initial merge location to the final merge location: and determining to modify the vehicle trajectory to yield to the object based at least in part on the first time and the second time associated with the object traveling from the initial merge location to the final merge location.

F. A method comprising: determining that a predicted path of an object is associated with a planned path of a vehicle: determining a threshold time associated with a merge operation of the vehicle relative to the object, wherein the threshold time represents an amount of time for the vehicle to travel from a current vehicle location of the vehicle to a final merge location, wherein the final merge location represents a location at which the predicted path overlaps the planned path and a vehicle speed of the vehicle is within a threshold speed of an object speed of the object: determining a predicted amount of time for the object to travel from a current object location of the object to the final merge location: and determining an action for the vehicle to perform based at least in part on the predicted amount of time and the threshold time.

G. The method of paragraph F, further comprising controlling the vehicle based at least in part on the action.

H. The method of either paragraph F or paragraph G, wherein the action comprises at least one of: maintaining a vehicle trajectory associated with the vehicle: or modifying the vehicle speed of the vehicle.

I. The method of any one of paragraphs F-H, further comprising determining an initial merge location associated with the merge operation, the initial merge location being based at least in part on the planned path and the predicted path: and determining, based at least in part on an acceleration, a first time and a second time associated with the object traveling from the initial merge location to the final merge location, wherein determining the action is further based at least in part on the first time and the second time associated with the object traveling from the initial merge location to the final merge location, and wherein the action comprises yielding to the object.

J. The method of any one of paragraphs F-I, further comprising: determining the object speed associated with the object: determining that the vehicle speed of the vehicle is equal to or greater than the object speed: determining a first time associated with the vehicle traveling to an initial merge location based at least in part on the vehicle speed: determining a second time associated with the object traveling to the initial merge location based at least in part on the object speed: determining that the first time is at or before the second time: and determining to maintain a vehicle trajectory of the vehicle.

K. The method of any one of paragraphs F-J, wherein the object speed is determined based at least in part on at least one of: sensor data received from a sensor in the environment: a curvature of a road associated with the object traveling in the environment: or a speed limit associated with the road.

L. The method of any one of paragraphs F-K, wherein determining the threshold time for the merge operation comprises: determining a first time associated with the final merge location, wherein the first time represents a first amount of time associated with at least one of the vehicle or the object traveling from an initial merge location to the final merge location: and determining a second time associated with the initial merge location, wherein the second time represents a second amount of time associated with the vehicle traveling from the current vehicle location to the initial merge location, wherein the threshold time is based at least in part on the first time and the second time.

M. The method of paragraph L, wherein the first time is based at least in part on at least one of: the vehicle speed of the vehicle at the initial merge location: the object speed of the object at the initial merge location: a positive acceleration of the vehicle: or a negative acceleration of the object.

N. The method of paragraph M, wherein the positive acceleration of the vehicle and the negative acceleration of the object are predetermined accelerations comprising a same absolute value.

O. A system or device comprising: one or more processors: and one or more non-transitory computer readable media storing instructions that, when executed, cause the one or more processors to perform a computer-implemented method as described in any one of paragraphs F-M.

P. A system or device comprising: a means for processing: and a means for storing coupled to the means for processing, the means for storing including instructions to configure one or more devices to perform a computer-implemented method as described in any one of paragraphs F-M.

Q. One or more non-transitory computer readable media storing instructions that, when executed, cause one or more processors to perform a method recited in any one of paragraphs F-M.

R. One or more non-transitory computer-readable media storing instructions that, when executed, cause one or more processors to perform operations comprising: determining that a predicted path of an object in an environment of a vehicle is associated with a planned path of the vehicle: determining a threshold time associated with a merge operation of the vehicle relative to the object, wherein the threshold time represents an amount of time for the vehicle to travel from a current vehicle location of the vehicle to a final merge location, wherein the final merge location represents a location at which the predicted path overlaps the planned path and a vehicle speed of the vehicle is within a threshold speed of an object speed of the object: determining a predicted time for the object to travel from a current object location of the object to the final merge location: and determining an action for the vehicle to perform based at least in part on the predicted time and the threshold time S. The one or more non-transitory computer-readable media of paragraph R, the operations further comprising determining the object speed based at least in part on at least one of: sensor data received from a sensor in the environment: a curvature of a road associated with the object traveling in the environment: or a speed limit associated with the road.

T. The one or more non-transitory computer-readable media of either paragraph R or paragraph S, wherein the final merge location further represents a location associated with a rear portion of the vehicle being located ahead of and proximate to a front portion of the object after the merge operation of the vehicle relative to the object.

U. A vehicle comprising: a processor: and a non-transitory computer-readable medium as any one of paragraphs R-T describe coupled to the processor.

V. A system comprising: a processor: and a non-transitory computer-readable medium as any one of paragraphs R-T describe coupled to the processor.

While the example clauses described above are described with respect to one particular implementation, it should be understood that, in the context of this document, the content of the example clauses can also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
  one or more processors; and
  one or more non-transitory computer-readable media storing instructions executable by the one or more processors, wherein the instructions, when executed, cause the system to perform operations comprising:
    determining, based at least in part on sensor data from a sensor associated with a vehicle, a predicted path of an object through an environment proximate the vehicle;
    determining that the predicted path of the object and a planned path of a vehicle trajectory of the vehicle merge at an initial merge location, wherein the initial merge location is within a threshold distance of an intersection of the predicted path of the object and the planned path of the vehicle trajectory;
    determining, based at least in part on a vehicle speed, an object speed, and the initial merge location, a threshold time associated with a final merge location, wherein the final merge location is based at least in part on the vehicle speed and the object speed, wherein the threshold time represents an amount of time for the vehicle to travel from a current vehicle location of the vehicle to the final merge location associated with a merge operation, wherein the final merge location represents an overlap between the predicted path and the planned path, wherein the overlap represents a region in which the predicted path and the planned path share a common direction of travel over a same portion of a road, and wherein the vehicle speed of the vehicle is within a threshold speed associated with the object speed of the object;
    determining a predicted time for the object to travel from a current object location of the object to the final merge location;
    determining an action for the vehicle to perform based at least in part on a difference between the predicted time and the threshold time; and
    controlling the vehicle based at least in part on the action, wherein the action comprises at least one of maintain the vehicle trajectory of the vehicle to merge in the common direction of travel as the object or modify the vehicle trajectory of the vehicle to yield to the object.

2. The system of claim 1, wherein determining the threshold time associated with the final merge location comprises:
  determining a first time associated with the final merge location, wherein the first time represents a first amount of time associated with at least one of the vehicle or the object traveling from the initial merge location to the final merge location; and
  determining a second time associated with the initial merge location, wherein the second time represents a second amount of time associated with the vehicle traveling from the current vehicle location to the initial merge location,
  wherein the threshold time is based at least in part on the first time and the second time.

3. The system of claim 2, wherein the first time is based at least in part on at least one of:
  the vehicle speed of the vehicle at the initial merge location;
  the object speed of the object at the initial merge location;
  a positive acceleration of the vehicle; or
  a negative acceleration of the object.

4. The system of claim 3, wherein the positive acceleration of the vehicle and the negative acceleration of the object are predetermined accelerations comprising a same absolute value.

5. The system of claim 1,
  wherein the final merge location is based at least in part on the vehicle speed and the object speed, and
  wherein the operations further comprise:
    determining a first time and a second time associated with the object traveling from the initial merge location to the final merge location; and
    determining to modify the vehicle trajectory to yield to the object based at least in part on the first time and the second time associated with the object traveling from the initial merge location to the final merge location.

6. The system of claim 1, wherein the operations further comprise:
  determining, based at least in part on an acceleration, a first time and a second time associated with the object traveling from the initial merge location to the final merge location,
  wherein determining the action is further based at least in part on the first time and the second time associated with the object traveling from the initial merge location to the final merge location, and
  wherein the action comprises yielding to the object.

7. The system of claim 1, wherein the operations further comprise:
  determining the object speed associated with the object;
  determining that the vehicle speed of the vehicle is equal to or greater than the object speed;
  determining a first time associated with the vehicle traveling to the initial merge location based at least in part on the vehicle speed;
  determining a second time associated with the object traveling to the initial merge location based at least in part on the object speed;
  determining that the first time is at or before the second time; and
  determining to maintain the vehicle trajectory of the vehicle.

8. A method comprising:
  determining that a predicted path of an object and a planned path of a vehicle merge at an initial merge location, wherein the initial merge location is within a threshold distance of an intersection of the predicted path of the object and the planned path of the vehicle;
  determining, based at least in part on a vehicle speed, an object speed, and the initial merge location, a threshold time associated with a final merge location, wherein the threshold time represents an amount of time for the vehicle to travel from a current vehicle location of the vehicle to the final merge location, wherein the final merge location represents an overlap between the predicted path and the planned path, wherein the overlap represents a region in which the predicted path and the planned path share a common direction of travel over a same portion of a road, and wherein the vehicle speed of the vehicle is within a threshold speed associated with the object speed of the object;
  determining a predicted amount of time for the object to travel from a current object location of the object to the final merge location;
  determining an action for the vehicle to perform based at least in part on the predicted amount of time and the threshold time; and
  controlling the vehicle based at least in part on the action, wherein the action comprises at least one of maintaining a vehicle trajectory of the vehicle to merge in the common direction of travel as the object or modify the vehicle trajectory of the vehicle to yield to the object.

9. The method of claim 8, further comprising:
  determining, based at least in part on an acceleration, a first time and a second time associated with the object traveling from the initial merge location to the final merge location,
  wherein determining the action is further based at least in part on the first time and the second time associated with the object traveling from the initial merge location to the final merge location, and
  wherein the action comprises yielding to the object.

10. The method of claim 8, further comprising:
  determining the object speed associated with the object;
  determining that the vehicle speed of the vehicle is equal to or greater than the object speed;
  determining a first time associated with the vehicle traveling to the initial merge location based at least in part on the vehicle speed;
  determining a second time associated with the object traveling to the initial merge location based at least in part on the object speed;
  determining that the first time is at or before the second time; and
  determining to maintain the vehicle trajectory of the vehicle.

11. The method of claim 8, wherein the object speed is determined based at least in part on at least one of:
  sensor data received from a sensor in an environment;
  a curvature of a road associated with the object traveling in the environment; or
  a speed limit associated with the road.

12. The method of claim 8, wherein determining the threshold time associated with the final merge location comprises:
  determining a first time associated with the final merge location, wherein the first time represents a first amount of time associated with at least one of the vehicle or the object traveling from the initial merge location to the final merge location; and
  determining a second time associated with the initial merge location, wherein the second time represents a second amount of time associated with the vehicle traveling from the current vehicle location to the initial merge location,
  wherein the threshold time is based at least in part on the first time and the second time.

13. The method of claim 12, wherein the first time is based at least in part on at least one of:
  the vehicle speed of the vehicle at the initial merge location;
  the object speed of the object at the initial merge location;
  a positive acceleration of the vehicle; or
  a negative acceleration of the object.

14. The method of claim 13, wherein the positive acceleration of the vehicle and the negative acceleration of the object are predetermined accelerations comprising a same absolute value.

15. One or more non-transitory computer-readable media storing instructions that, when executed, cause one or more processors to perform operations comprising:
  determining that a predicted path of an object and a planned path of a vehicle merge at an initial merge location, wherein the initial merge location is within a threshold distance of an intersection of the predicted path of the object and the planned path of the vehicle;
  determining, based at least in part on a vehicle speed, an object speed, and the initial merge location, a threshold time associated with a final merge location, wherein the threshold time represents an amount of time for the vehicle to travel from a current vehicle location of the vehicle to the final merge location, wherein the final merge location an overlap between the predicted path and the planned path, wherein the overlap represents a region in which the predicted path and the planned path share a common direction of travel over a same portion of a road, and wherein the vehicle speed of the vehicle is within a threshold speed associated with the object speed of the object;

determining a predicted time for the object to travel from a current object location of the object to the final merge location;

determining an action for the vehicle to perform based at least in part on the predicted time and the threshold time; and controlling the vehicle based at least in part on the action, wherein the action comprises at least one of maintain a vehicle trajectory of the vehicle to merge in the common direction of travel as the object or modify the vehicle trajectory of the vehicle to yield to the object.

16. The one or more non-transitory computer-readable media of claim 15, the operations further comprising determining the object speed based at least in part on at least one of:

sensor data received from a sensor in an environment;

a curvature of a road associated with the object traveling in the environment; or a speed limit associated with the road.

17. The one or more non-transitory computer-readable media of claim 15, wherein the final merge location further represents a location associated with a rear portion of the vehicle being located ahead of and proximate to a front portion of the object.

18. The one or more non-transitory computer-readable media of claim 15, the operations further comprising:

determining, based at least in part on an acceleration, a first time and a second time associated with the object traveling from the initial merge location to the final merge location, wherein determining the action is further based at least in part on the first time and the second time associated with the object traveling from the initial merge location to the final merge location, and wherein the action comprises yielding to the object.

19. The one or more non-transitory computer-readable media of claim 18, wherein the initial merge location represents a location proximate an intersection of a vehicle corridor associated with the planned path and an object corridor associated with the predicted path.

20. The one or more non-transitory computer-readable media of claim 15, determining the threshold time comprises:

determining a first time associated with the final merge location, wherein the first time represents a first amount of time associated with at least one of the vehicle or the object traveling from an initial merge location to the final merge location, wherein the first time is based at least in part on at least one of:

the vehicle speed of the vehicle at the initial merge location;

the object speed of the object at the initial merge location; or an acceleration of at least one of the object or the vehicle; and determining a second time associated with the initial merge location, wherein the second time represents a second amount of time associated with the vehicle traveling from the current vehicle location to the initial merge location, wherein the threshold time is based at least in part on the first time and the second time.

* * * * *